US011917521B2

(12) United States Patent
Sivaraj et al.

(10) Patent No.: US 11,917,521 B2
(45) Date of Patent: Feb. 27, 2024

(54) METHOD AND APPARATUS FOR UNIQUE IDENTIFICATION OF INDIVIDUAL USERS IN THE RADIO ACCESS NETWORK (RAN) INTELLIGENT CONTROLLER

(71) Applicant: Mavenir Systems, Inc., Richardson, TX (US)

(72) Inventors: Rajarajan Sivaraj, Plano, TX (US); Peter McCann, Bridgewater, NJ (US); Kuntal Chowdhury, Andover, MA (US)

(73) Assignee: Mavenir Systems, Inc., Richardson, TX (US)

( * ) Notice: Subject to any disclaimer, the term of this patent is extended or adjusted under 35 U.S.C. 154(b) by 140 days.

(21) Appl. No.: 17/576,072

(22) Filed: Jan. 14, 2022

(65) Prior Publication Data

US 2022/0232452 A1 Jul. 21, 2022

Related U.S. Application Data

(60) Provisional application No. 63/139,333, filed on Jan. 20, 2021.

(51) Int. Cl.
*H04W 40/24* (2009.01)
*H04W 8/00* (2009.01)
(Continued)

(52) U.S. Cl.
CPC ......... *H04W 40/246* (2013.01); *H04W 8/005* (2013.01); *H04W 8/26* (2013.01); *H04W 80/02* (2013.01)

(58) Field of Classification Search
CPC ..... H04W 40/246; H04W 8/005; H04W 8/26; H04W 80/02
See application file for complete search history.

(56) References Cited

U.S. PATENT DOCUMENTS

2020/0178326 A1* 6/2020 Sirotkin ................ H04W 76/12

FOREIGN PATENT DOCUMENTS

WO WO-2020049335 A1 * 3/2020
WO 2021001680 A1 1/2021
(Continued)

OTHER PUBLICATIONS

Nokia et al: "(TP for NR BL CR for TS 1-2038.463) UE Identification and Trace correlation over EI", 3GPP Draft; R3-186721 UE Identification Over E1_TP38.463, 3rd Generation Partnership Project (3GPP), Mobile Competence Centre ; 650, Route Des Lucioles; F-06921 Sophia-Antipolis Cedex ; France; Nov. 2, 2018; XP051482845; URL:http://www.3gpp.org/ftp/tsg%5Fran/WG3%.
(Continued)

*Primary Examiner* — Saad A. Waqas
(74) *Attorney, Agent, or Firm* — Ruggiero, McAllister & McMahon LLC

(57) ABSTRACT

A method of uniquely identifying a user equipment (UE) connected to a radio access network (RAN) includes: providing a radio access network intelligent controller (RIC) component associated with the RAN; configuring, by a packet data convergence protocol (PDCP) layer, a default data radio bearer (DRB) for the UE to maintain Internet Protocol (I) Protocol Data Unit (PDU) connectivity with the RAN; and using, by the RIC, one of NG uplink (UL) user plane (UP) Transport Layer Information or S1 UL UP Transport Layer Information of the default DRB for uniquely identifying the UE for the entire time the UE is connected to the RAN. The unique identification for the UE is retained across at least one of i) multiple connectivity sessions for the UE, ii) multiple mobility sessions for the UE, and iii) multiple context sessions for the UE.

20 Claims, 13 Drawing Sheets

(51) Int. Cl.
*H04W 8/26* (2009.01)
*H04W 80/02* (2009.01)

(56) References Cited

FOREIGN PATENT DOCUMENTS

WO    WO-2021006784 A1 * 1/2021
WO    WO-2021029804 A1 * 2/2021

OTHER PUBLICATIONS

ORAN Alliance "0-RAN: Towards an Open and Smart RAN",0-RAN Alliance White Paper, Oct. 1, 2018 (Oct. 1, 2018), pp. 1-19, XP055773799, URL:https://static1.squarespace.com/static/5ad774cce74940d7115044b0/t/5bc79b371905f4.
Extended European Search Report for corresponding European Application No. EP 22 15 2038; 6 pages, dated Jun. 14, 2022.
ORAN-WG1.O1 Interface.0-v04.00 "O-RAN Operations and Maintenance Interface Specification", O-RAN Alliance, 2021.
ORAN-WG3.E2AP-v01.00 "O-RAN Working Group 3, Near-Real-time RAN Intelligent Controller, E2 Application Protocol (E2AP)", O-RAN Alliance, 2020.
ORAN-WG3.E2SM-KPM-v01.00 "O-RAN Working Group 3, Near-Real-time RAN Intelligent Controller, E2 Service Model (E2SM) KPM", O-RAN Alliance, 2020.
ORAN-WG3.E2SM-NI-v01.00.00 "O-RAN Working Group 3, Near-Real-time RAN Intelligent Controller, E2 Service Model (E2SM) RAN Function Network Interface (NI)", O-RAN Alliance, 2020.
3GPP TS 36.413 v16.0.0 "3rd Generation Partnership Project; Technical Specification Group Radio Access Network; Evolved Universal Terrestrial Radio Access Network (E-UTRAN);S1 Application Protocol (S1AP) (Release 16)" 3rd Generation Partnership Project, Dec. 2019.
3GPP TS 36.423 v16.0.0 "3rd Generation Partnership Project; Technical Specification Group Radio Access Network; Evolved Universal Terrestrial Radio Access Network (E-UTRAN); X2 Application Protocol (X2AP) (Release 16)" 3rd Generation Partnership Project, Dec. 2019.
3GPP TS 38.413 v15.6.0 "3rd Generation Partnership Project; Technical Specification Group Radio Access Network; NG-RAN; NG Application Protocol (NGAP) (Release 15)" 3rd Generation Partnership Project, Dec. 2019.
3GPP TS 38.423 v16.0.0 "3rd Generation Partnership Project; Technical Specification Group Radio Access Network; NG-RAN; XN Application Protocol (XnAP) (Release 16)" 3rd Generation Partnership Project, Dec. 2019.
3GPP TS 38.473 v16.2.0 "3rd Generation Partnership Project; Technical Specification Group Radio Access Network; Ng-Ran; F1 Application Protocol (F1AP) (Release 16)" 3rd Generation Partnership Project, Jul. 2020.
3GPP TS 38.463 v16.2.0 "3rd Generation Partnership Project; Technical Specification Group Radio Access Network; NG-RAN; E1 Application Protocol (E1AP) (Release 16)" 3rd Generation Partnership Project, Jul. 2020.

* cited by examiner

METHOD AND APPARATUS FOR UNIQUE IDENTIFICATION OF INDIVIDUAL USERS IN THE RADIO ACCESS NETWORK (RAN) INTELLIGENT CONTROLLER

CROSS-REFERENCE TO RELATED APPLICATIONS

The present application claims the benefit of U.S. Provisional Patent Application No. 63/139,333, filed on Jan. 20, 2021, which is incorporated by reference herein in its entirety.

BACKGROUND OF THE DISCLOSURE

1. Field of the Disclosure

The present disclosure relates to cellular Radio Access Network (RAN), and relates more particularly to unique identification of users in the RAN intelligent controller (RIC).

2. Description of the Related Art

The evolution of 5G cellular technology and the proliferation of mobile devices have resulted in increased demands for the network operators to provision next-generation mobile telecommunication services, such as immersive AR/VR, 360° video streaming, ultra-high-definition video streaming, intelligent transportation services for autonomous vehicles, factory automation and mission critical communication, coverage and capacity services for wearables and IoT devices, etc. The requirements for these services fall under one of the following categories:
   a) Ultra-reliable low latency services (e.g., requiring 1-5 ms user-plane latency and 99.9999% reliability),
   b) Enhanced mobile broadband services (e.g., 100 Mbps average user data-rate and 5-20 ms user-plane latency), and
   c) Massive Internet of Things (e.g. $10^6$ IoT devices per $km^2$, 10 Mbps traffic per $m^2$, etc.)

Mobile network operators are currently not able to provide these services with guarantees, mainly due to the bottleneck in the wireless link implemented by the cellular Radio Access Network (RAN) between the mobile User Equipment (UE) and the base station transceiver, called the next-generation node B (or gNB). The cellular RAN offers the following functions:
   a) Control Plane, which is responsible for connectivity, mobility, user context and bearer context-related signaling between the RAN and the mobile UE,
   b) User Plane, which is responsible for data transfer between the RAN and the UE, and
   c) Management Plane, which is responsible for network element configuration of the RAN and minimization of drive test tracing periodicities for the UE.

The layers of the 5G cellular RAN protocol stack (such as RRC, SDAP, PDCP, RLC, MAC, PHY) manage these functions by using procedures and by maintaining the relevant UE state information. However, there are complex inter-dependencies between the layers of the RAN protocol stack, since the intricate network and traffic dynamicity affects the procedures and adversely impacts the performance of the functions, especially while offering services with stringent demands on latency, throughput and reliability, as those service listed above. In particular, the cellular RAN procedures are managed by proprietary vendor algorithms (solutions), which do not necessarily represent optimal or data-driven customized solutions. Moreover, in legacy 3GPP systems, these solutions are not programmable and there are significant limitations in configuring the policies governing these solutions, even for the mobile network operator. Due to the vendor-specific proprietary nature of implementation, it is challenging to characterize the algorithms. In turn, it is difficult to quantify the complex inter-dependencies between the RAN entities and efficiently capture the complex interactions among the layers of the RAN protocol stack.

Using O-RAN architecture, the components of the RAN can be opened-up to a new component, called the RAN Intelligent Controller (RIC) using open interfaces and extensible applications, called xApps, from third parties (including the mobile network operators themselves) can be deployed in the RIC that can use advanced analytics, machine learning and artificial intelligence techniques (e.g., based on the data exposed to the RIC from the RAN) to characterize and predict the performance of the algorithms and further optimize the RAN functions via control actions sent back to the RAN from the RIC over the open interfaces. In this regard, the RIC harnesses the principles of software-defined networking to control the functions of the RAN using programmable xApps and standardized interfaces. This framework allows the RIC to optimize the RAN functions on a per-UE basis across the different layers of the 5G RAN protocol stack that are managed for individual UEs connected to the gNB, as exemplified below:

| Layer | Functions |
| --- | --- |
| RRC | Primary and secondary cell selection, connectivity and mobility management, bearer configuration and cell group configuration |
| SDAP | Mapping QoS flows to data radio bearers |
| PDCP | Packet duplication, multi-RAT traffic split |
| RLC | Segmentation, transmission, and retransmission buffer management |
| MAC | Bandwidth part, Physical Resource Block and Transmission Time Interval allocation for MAC resources and HARQ retransmission |
| PHY | Radio Frequency transmission, MIMO groups and beamforming weights |

However, in order to optimize the radio resource management (RRM) decisions to optimally control these functions on a per-UE basis, the individual UEs need to be distinctly identified in the MC. This is a challenge because the UE identifiers used by the RAN have, among others, the following characteristics:
   (i) Temporary in nature: The same identifiers are not retained for the UE across multiple connectivity sessions with different RAN nodes (e.g., different gNBs) during its mobility, as the UE still remains connected to the network.
   (ii) Varying across network interfaces: In order to distinctly identify a UE over a network interface connecting two gNBs or RAN nodes, a UE identifier is used for the continuous period of time that the UE's context remains active over the network interface. The UE's context remains active as long as the UE is connected to any of the node endpoints of the interface. This UE identifier varies across different interfaces over which the UE's context is maintained at any given point of time. There are no 3GPP standard procedures in the RAN that perform correlation of the temporary UE identifiers used across the network interfaces. This is also applicable to Radio Network Temporary Identifiers (RNTI) for the UE, which changes when the UE changes its connectivity across different DUs under the same CU, or when the UE moves across different CUs.

(iii) Non-availability of permanent identifiers and subscriber-related information like IMSI, IMEI in the RAN: Permanent mobile-user-specific subscriber information or mobile equipment identity are not available in cellular RAN. For privacy reasons, the 3GPP protocols are designed such that the RAN does not have access to subscriber information like IMSI, IMEI, etc. The network interfaces connecting the RAN nodes do not exchange any permanent subscriber identity information of the mobile UEs.

Hence, if the RIC is to optimize the procedures of the RAN on a per-UE basis for the period of time that the UE is connected to the network and has an active context, the RIC will need to maintain the identity of individual UEs across connectivity, mobility and bearer sessions during this period. Currently, there is no definitive mechanism for controlling the RAN from the MC on a per-UE basis, apart from injecting complete network interface messages that use network-interface-specific temporary RAN UE identifiers or temporary RNTIs.

Therefore, there is a need to provide an improved mechanism for controlling the RAN from the RIC on a per-UE basis.

SUMMARY OF THE DISCLOSURE

According to an example embodiments of the present disclosure, for the RIC components to be able to uniquely identify a UE, an information element (IE) that satisfies the following criteria is used: a) the IE is commonly exchanged as part of UE-associated messages across all the network interfaces in the RAN; b) the IE retains the same value for the UE when it is exchanged as part of UE-associated messages across all the network interfaces; and iii) the IE retains the same value for the UE across multiple connectivity and mobility sessions for the UE as long as it remains connected to the network.

According to an example embodiment, NG or S1 (NG/S1) uplink (UL) user plane (UP) Transport Layer Information is used for UE identification. According to this example embodiment, UE identification is achieved by providing a mechanism to use the NG UL UP Transport Layer Information IE for the default bearer of the UE.

According to an example embodiment of the method, NG/S1 UL UP Transport Layer Information IE is exchanged over at least one of the following interfaces: F1, E1, Xn, NG, X2, and S1.

According to an example embodiment of the present disclosure, other RAN network-interface identifiers for the UE are correlated with NG/S1 UL UP Transport Layer Information for its default PDU session and DRB.

According to an example embodiment of the method, the RAN UE Identifiers used over the F1 interface for the UE are gNB-CU UE F1AP ID and the gNB-DU UE F1AP ID.

According to an example embodiment of the method, the RAN UE Identifiers used over the E1 interface for the UE are gNB-CU-CP UE E1AP ID and the gNB-CU-UP UE E1AP ID.

According to an example embodiment of the method, the RAN UE Identifiers used over the Xn interface for the UE are Source NG-RAN node UE XnAP ID and the Target NG-RAN node UE XnAP ID.

According to an example embodiment of the method, the RAN UE Identifiers used over the NG interface for the UE are AMF UE NGAP ID and the RAN UE NGAP ID.

According to an example embodiment of the method, the RAN UE Identifiers used over the X2 interface for the UE are MeNB UE X2AP ID and the SgNB UE X2AP ID.

According to an example embodiment of the method, the RAN UE Identifiers used over the S1 interface for the UE are eNB UE S1AP ID and the MME UE S1AP ID.

DETAILED DESCRIPTION

Figure 1:
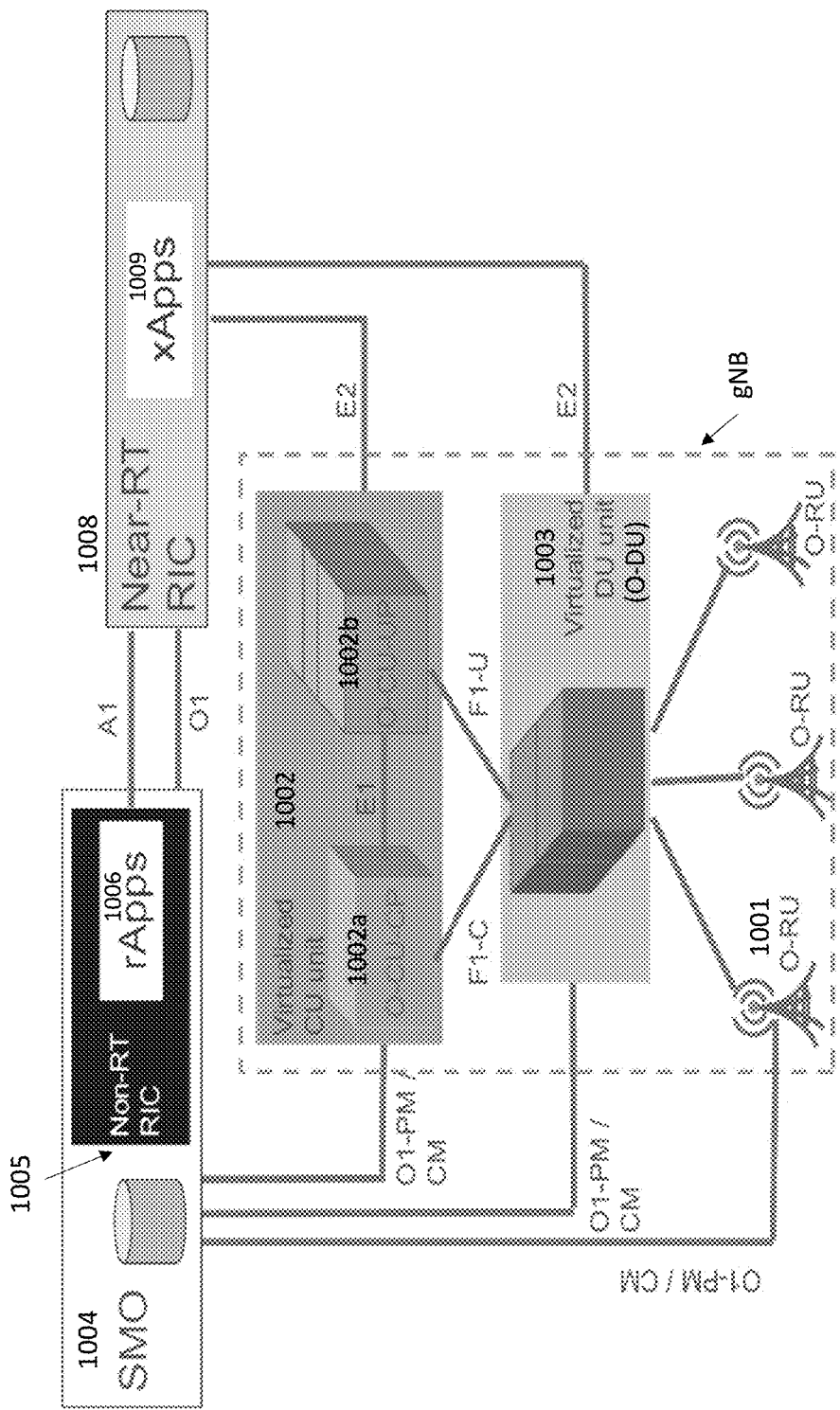
FIG. 1 is a schematic diagram of the O-RAN architecture including various O-RAN nodes and the RIC components.

A summary of the O-RAN architecture is provided below in connection with FIG. 1, which shows various O-RAN nodes and the RIC components. A gNB has a baseband unit (BBU) that processes the functions of the RAN protocol stack and one or more Radio Units (RU), e.g., O-RU 1001 shown in FIG. 1, that are used for transmission of data and signals. The baseband unit can either be monolithic or disaggregated. In a disaggregated gNB, the baseband unit is logically split into a Centralized Unit (CU) node, 1002, and one or more distributed unit (DU) nodes, 1003. The CU node 1002 can be further logically split into a Centralized Unit-Control Plane (CU-CP) function, e.g., O-CU-CP 1002a, and one or more Centralized Unit-User Plane (CU-UP) functions, e.g., O-CU-UP 1002b. The CU-CP is responsible for managing the functions of the RRC and PDCP-Control (PDCP-C) layers. The CU-UP is responsible for managing the functions of the SDAP and PDCP-User (PDCP-U) layers. The DU is responsible for managing the functions of the RLC, MAC, and Upper PHY layers, while the RU is responsible for radio frequency transmission. The interface between the CU-CP and the DU is called F1-C, while the interface between the CU-UP and the DU is called F1-U. The interface between the CU-CP and the CU-UP is called E1. The DU interfaces with the RU using the enhanced Common Public Radio Interface (eCPRI).

The CU-CP of one gNB interfaces with the CU-CP of a neighboring gNB over the Xn-C interface, while the CU-UP of a gNB interfaces with the CU-UP of a neighbor over the Xn-U interface. Also, an LTE base station (called the evolved-Node B (or eNB)) and the gNB CU-CP can interface with each other using the X2-C interface, while the eNB interfaces with the gNB CU-UP using the X2-U interface. The CU-CP of the gNB interfaces with the NG-Core (AMF, UPF, etc.) using the NG interface. If the F1, E1 and Xn interfaces among the RAN nodes are O-RAN-compliant open interfaces, and if the eCPRI is compliant with O-RAN-specified open-fronthaul interface, then these nodes are called O-CU-CP, O-CU-UP, O-DU and O-RU (as shown in FIG. 1). In a monolithic gNB, however, the F1 and E1 interfaces are not present, and the Xn interface is used to establish communication between 2 neighboring gNBs. If the Xn interface is an O-RAN-compliant open-interface, then the monolithic gNB is called the O-gNB.

The O-CU-CP, O-CU-UP and O-DU nodes (or the O-gNB, in the case of O-RAN compliant monolithic gNB) communicate with the Service Management and Orchestration (SMO) framework (shown as module 1004 in FIG. 1), which is responsible for Management plane functions (Operations, Administration and Management-OA&M) for the RAN, over the O-RAN-standardized O1 interface, while the O-RU communicates with the SMO over M-plane open front-haul interface. The O-RAN nodes send aggregated performance measurement data reports and traces averaged at non-real-time (non-RT) granularities to the SMO over O1. The performance measurement data can be aggregated at the network element-level or cell-level or slice-level or UE-level over non-RT granularities. For UE-level aggregation, the Performance Measurements (PMs) are averaged over the duration of an entire radio bearer session, and for cell-level, the PMs are averaged across the UEs connected to the cell—both over non-RT granularities.

One of the RIC components, i.e., the non-RT MC 1005 shown in FIG. 1, is deployed inside the SMO, which access these data reports from the O-RAN nodes received over the O1 interface and uses RIC applications (called rApps, 1006) that train and develop machine learning (ML) models offline over the O1-reported data, based on which, declarative policies and enrichment information are generated, which are sent to the near-RT MC 1008 over the O-RAN-standardized A1 interface. The trained ML models can also be deployed over the O1 interface in the near-RT RIC 1008, which acts as an inference host. The non-RT MC 1005 sends ML-driven recommendations for cell-level configuration to the SMO over the O-RAN-standardized R1 interface (not shown). These cell-level parameters are configured over the O1 interface sent from the SMO to the O-RAN nodes.

On the other hand, the O-CU-CP, O-CU-UP and O-DU nodes (collectively referred to as the E2 nodes) also interface with another MC component, the near-RT MC 1008, over the O-RAN standardized E2 interface, e.g., by sending fine-grained data, comprising mostly of per-UE measurements and UE state data across the layers of the RAN protocol stack. The difference between O1 data reports and E2 data reports is that O1 data is aggregated over longer time windows and generated at non-RT granularities (i.e. >1 second), while the E2 data is generated at near-RT granularities (i.e., in the order of 10 ms to 1 sec). The near-RT MC 1008, which includes xApps 1009, then uses the declarative policies received over the A1 interface and the fine-grained E2 data for generating per-UE control decisions and imperative policies for radio resource management on a per-UE basis across the layers of the RAN protocol stack. These decisions can be based on online, hybrid machine learning, and/or reinforcement learning-based algorithms, and the decisions are sent as control actions back from the near-RT MC 1008 to the E2 nodes (i.e., O-CU-CP 1002a, O-CU-UP 1002b and O-DU 1003) over the E2 interface.

In the above-described manner, the non-RT RIC 1005 can i) recommend optimization of cell-level configuration parameters, which are then sent as control actions from the SMO 1004 to the O-RAN nodes over the O1 interface, and ii) send UE-level/slice-level/cell-level declarative policies to the near-RT RIC 1008 over the A1 interface. The near-RT RIC 1008 then sends control actions back to O-CU-CP 1002a, O-CU-UP 1002b and O-DU 1003 over the E2 interface.

Data reporting will be discussed in this section. The procedures of the E2 interface for the near-RT RIC 1008 are standardized by the E2AP technical specification (version 1.01). The E2AP procedures allow subscription of 4 types of services by the near-RT RIC 1008 for the O-RAN nodes of O-CU-CP 1002a, O-CU-UP 1002b and O-DU 1003, which services include INSERT, REPORT, CONTROL and POLICY services. The E2 services are standardized by the E2 Service Model (E2SM) technical specification. Currently, two E2SMs have been standardized by the O-RAN standards, one called E2SM-Network Interface (E2SM-NI) version 1.0, and the other called E2SM-Key Performance Measurement (E2SM-KPM) version 1.0. The E2SM-NI standardizes reporting of per-UE data exchanged across the network interfaces from the E2 node, i.e., when a UE-associated event happens in the RAN, the UE-associated signaling can be triggered between the E2 nodes in order to update the UE state, and the pertinent information elements (IEs) are exchanged as part of signaling messages between the E2 nodes. This data is reported to the near-RT RIC 1008 either as complete network interface messages or partial network interface messages, where selected Information Elements (IEs) exchanged as part of network interface messages from or to the E2 node are exposed to the near-RT MC 1008 over the E2 interface. The reporting of complete or partial network interface messages based on the occurrence of a UE-associated event in the RAN can be configured by the MC SUBSCRIPTION procedure, which is detailed in E2AP specification v1.0.

Similarly, the O1 interface (e.g., denoted as O1-PM/CM in FIG. 1) supports reporting of performance measurement data and tracing, as specified in technical specification v4.0 of the O1 interface in the O-RAN standards. Tracing feature supports cell-level call tracing and UE-level Minimization of Drive Test (MDT) tracing, and performance management services involve reporting of key performance measurement data on a cell-level and UE-level basis from the network elements in the O-RAN nodes to the SMO 1004 over the O1 interface. Cell-level call tracing involves tracing of UE-associated and non-UE-associated network interface messages exchanged among the O-RAN nodes serving the list of cells configured for tracing by the SMO. Similarly, the level of tracing, i.e., minimum, medium or maximum level that reflects the amount of information traced from the network interface messages, can also be configured by the SMO 1004. The call trace configuration is done from the SMO to the O-RAN nodes over the O1 interface, since the interface supports configuration management. This call trace configuration results in tracing of messages exchanged across the network interfaces between the O-RAN nodes over the O1 interface that are triggered when the UE-associated and non-UE-associated events occur in the underlying RAN.

In this section, some of the challenges associated with UE identification are discussed in detail. The first issue involves varying UE identifiers across different network interfaces. For example, the O-CU-CP can send complete/partial network interface messages involving the E1, F1-C, Xn and NG interfaces, standardized in 3GPP TS 38.463, TS 38.473, TS 38.423 and TS 38.413, respectively, over the E2 interface to the near-RT RIC, and over the O1 interface to the SMO at varying granularities or levels of detailing. Reporting of network interface messages over the E2 interface (as supported in E2SM-NI) from the O-CU-CP happens when the O-CU-CP either sends UE-associated network interface messages or receives UE-associated network interface messages to or from other E2 nodes, which are triggered when a UE-associated event happens in the RAN. Similarly, tracing of network interface messages over the O1 interface from the O-CU-CP happens when the node either sends or receives UE- and non-UE-associated signaling messages to/from other O-RAN nodes. The level of granularity can vary across E2 and O1 interfaces, such as configuring to report complete network interface messages over the E2 interface and minimum-level tracing of messages over the O1 interface.

O-CU-CP reports "UE CONTEXT MODIFICATION REQUEST" message over the E2 and O1 interfaces to the near-RT RIC and SMO, when O-CU-CP exchanges this message with the O-DU over the F1 interface. This message ("UE CONTEXT MODIFICATION REQUEST") contains the gNB-CU F1AP UE ID protocol IE, which is the identifier used to identify a UE over the F1 interface. Similarly, O-CU-CP reports "BEARER CONTEXT MODIFICATION REQUEST" message when O-CU-CP exchanges the message with the O-CU-UP over the E1 interface. This message ("BEARER CONTEXT MODIFICATION REQUEST") contains the gNB-CU-CP E1AP UE ID protocol IE, which is the identifier used to identify a UE over the E1 interface. Similarly, O-CU-CP reports the "HANDOVER REQUEST" message when O-CU-CP exchanges the message with another gNB O-CU-CP over the Xn interface. This message ("HANDOVER REQUEST") contains the Source NG-RAN node UE XnAP ID reference protocol IE, which is the identifier used to identify a UE over the Xn interface. In addition, O-CU-CP reports the "INITIAL CONTEXT SETUP REQUEST" message when O-CU-CP receives the message from the AMF over the NG interface. This message ("INITIAL CONTEXT SETUP REQUEST") contains the AMF UE NGAP ID protocol IE, which is the identifier used to identify a UE over the NG interface. Since all the above-mentioned UE identifiers across different interfaces are different for the same UE, there is currently no known mechanism by which the near-RT MC and the non-RT MC components can map these different identifiers used across different network interfaces to the same UE, which would further be used to track the performance of the UE towards controlling and optimizing the RRM procedures for the UE from the MC to the RAN.

Another challenge associated with UE identification is temporary nature of UE identifiers used in the RAN. In an example case, let's assume the UE is subject to an intra-CU, inter-DU handover from a source primary cell in one O-DU to a target primary cell in another O-DU within the same O-CU. When the UE is connected to the source O-DU, the O-CU-CP uses a gNB-CU F1AP UE ID with the source O-DU to identify the UE. When the UE subsequently moves to the target O-DU, the same O-CU-CP uses a different gNB-CU F1AP UE ID with the target O-DU to identify the same UE. This issue is also applicable for handovers across the Xn interface, as well. In addition, the RAN does not retain the UE identifier for the same UE across two different connectivity sessions. As an example, if the UE is initially connected to an O-CU-CP and O-DU pair, and i) the O-CU-CP then releases the UE after some time, and ii) the UE subsequently reconnects to the same O-CU-CP and O-DU pair, the O-CU-CP does not retain the same UE identifier across these two different connectivity sessions. Therefore, with changes in connectivity and mobility sessions for the same UE, the UE identifier for the same UE keeps changing. There is currently no known mechanism by which the RIC components can map these temporary UE identifiers which can keep changing to the same UE, in order to track the performance of the UE for further optimization of radio resource management (RRM) decisions for the UE by the RIC.

Another challenge associated with UE identification is non-availability of permanent identifiers and subscriber-related information such as IMSI and IMEI in the RAN. Permanent UE subscriber information such as IMSI and IMEI are not exchanged from the AMF to the CU-CP over the NG interface for the purpose of protecting user privacy, and hence, not exchanged over other RAN interfaces such as F1, E1, Xn, etc. The Uu interface between the UE and the O-gNB also does not exchange this information. Hence, the RIC components do not have access to permanent UE identifier information, which poses a further challenge in identifying the UE for RRM optimization decisions at the RIC.

In addition to the above, the UE identity should be maintained in the RIC components for the continuous period of time that the UE is connected to the network across multiple connectivity, mobility and context sessions involving the same UE, for both disaggregated O-gNB as well as monolithic O-gNB deployments. Moreover, the problem is also relevant for LTE, 5G stand-alone (SA), 5G non-stand-alone (NSA) and for ng-eNB deployments. The problem sought to be addressed by the present disclosure is how the RIC components can be enabled to uniquely identify a UE based on the E2/O1 reports for the period of time that the UE is connected to the network.

According to an example embodiments of the present disclosure, for the MC components to be able to uniquely identify a UE, the following elements need to be satisfied:
1) An information element (IE) that is commonly exchanged as part of UE-associated messages across all the network interfaces in the RAN.
2) An IE that retains the same value for the UE when it is exchanged as part of UE-associated messages across all the network interfaces.
3) An IE that retains the same value for the UE across multiple connectivity and mobility sessions for the UE as long as it remains connected to the network.

Figure 2:
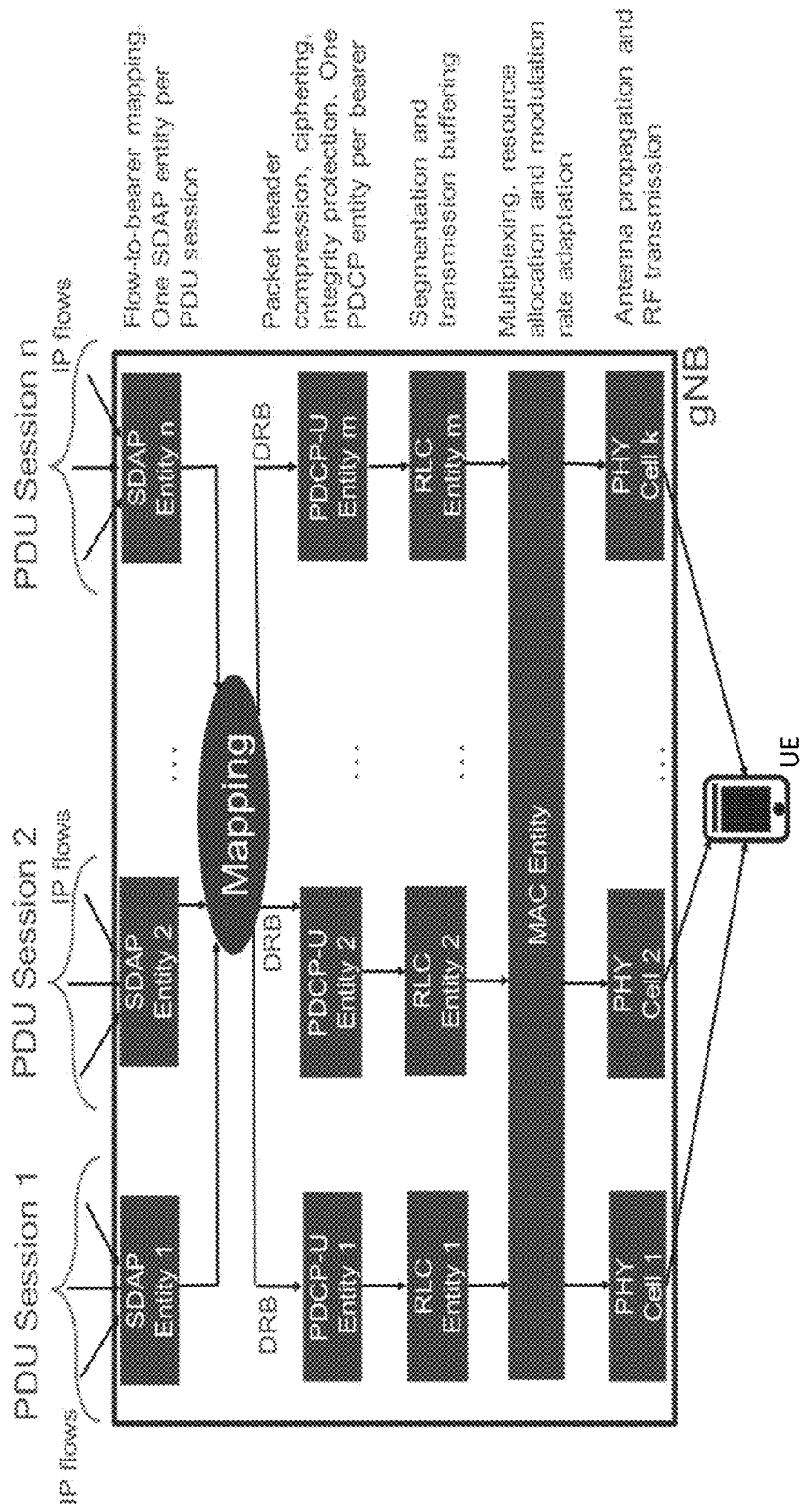
FIG. 2 illustrates multiple IP Protocol Data Unit (PDU) sessions and the associated transport-layer connections to the UE.

According to an example embodiment, NG or S1 (NG/S1) uplink (UL) user plane (UP) Transport Layer Information is used for UE identification. According to this example embodiment, UE identification is achieved by providing a mechanism to use the NG UL UP Transport Layer Information IE for the default bearer of the UE. FIG. 2, which illustrates multiple IP Protocol Data Unit (PDU) sessions and the associated transport-layer connections to the UE, is used to explain the notion of bearers. A UE can subscribe to more than one IP Protocol Data Unit (PDU) session, e.g., PDU Sessions 1 through n shown in FIG. 2, which sessions each generate one or more transport-layer connections between the UE and the application server. The IP packet flows are multiplexed onto the transport-layer connections and transmitted in the downlink communication to the UE (this notion is similar in the uplink communication from the UE to the application server, but the focus here is on the downlink for the sake of clarity). The UPF in the 5G Core Network binds the QoS flows to QoS parameters and forwards it to the gNB. The SDAP layer of the 5G gNB marks the QoS flows with QoS Flow Index (QFI), receives the QoS flows from the UPF and configures one or more SDAP entities, one SDAP entity per PDU session, and binds the QoS flows of the PDU session to the corresponding SDAP entity (e.g., SDAP Entities 1 through n shown in FIG. 2). The SDAP layer also multiplexes the QoS flows to the data radio bearers (DRB) sessions, configured by the PDCP layer. The PDCP layer configures one or more PDCP entities (e.g., PDCP-U Entities 1 through m shown in FIG. 2) for the UE, one per DRB session. A default DRB is always configured for the UE to maintain PDU data connectivity with the network. It is this default DRB of the UE whose NG UL UP Transport Layer Information IE that is used for UE identification. In the section below, the semantics of this IE and the rationale for using this IE for UE identification are discussed in detail. In addition to the SDAP and PDCP layers, other layers shown in FIG. 2 include: radio link control (RLC) layer (e.g., RLC Entities 1 through m); Medium Access Control (MAC) layer (e.g., MAC Entity); and physical (PHY) layer (e.g., PHY Cells 1 through k). Example functions of the entities in the various layers can be summarized as follows:

SDAP entities: flow-to-bearer mapping.

PDCP entities: packet header compression, ciphering, and integrity protection.

RLC entities: segmentation and transmission buffering.

MAC entity: multiplexing, resource allocation and modulation rate adaptation.

PHY cells: antenna propagation and RF transmission.

The semantics of NG uplink (UL) user plane (UP) Transport Layer Information IE of the default DRB of the UE is discussed here. The Transport Layer Information IE comprises the transport layer address for forwarding uplink IP packets, and the GPRS Tunneling Endpoint (GTP TEID) that identifies a virtual connection between the RAN and core networking components for routing the UE's default bearer-specific IP packets from the O-CU-UP to the UPF. The LTE equivalent is the S1 UL UP Transport Layer Information IE. This IE comprises the transport layer address and GTP TEID for forwarding uplink packets from O-eNB to S-GW.

The reasons for using NG/S1 UL UP Transport Layer Information IE are summarized below.

A. NG/S1 UL UP Transport Layer Information IE is commonly included as part of messages exchanged across all network interfaces, namely F1, E1, Xn/X2, NG. So, this IE can be correlated with other RAN network interface-specific UE identifiers used across each interface, such as gNB-CU UE F1AP ID, gNB-DU UE F1AP ID, gNB-CU-CP UE E1AP ID, source NG-RAN node UE XnAP ID reference, AMF UE NGAP ID, etc., in order to uniquely identify a UE and update the UE states in the MC.

B. NG/S1 UL UP Transport Layer Information IE does not change across multiple gNB or O-RAN node connectivity and mobility sessions involving the same UE and even when multiple bearer sessions are configured for the UE, as long as the UE is connected to the same 5G-Core (AMF/UPF), or when the LTE UE is connected to the same EPC (MME/S-GW).

C. NG/S1 UL UP Transport Layer Information IE does not change when the UE switches its RRC states between RRC_INACTIVE and RRC_CONNECTED, as long as the UE does not go back to RRC_IDLE state from RRC_CONNECTED state. However, if the UE goes back to RRC_IDLE state, the UE's RAN context is destroyed, and the RIC does not have to track and maintain the UE performance and further optimize the UE, until the UE gets back to RRC_CONNECTED state.

D. The anonymity and the privacy of the UE is still protected because the RIC cannot correlate NG/S1 UL UP Transport Layer Information IE with other UE-specific permanent subscriber information such as IMSI or IMEI, which are not exchanged as part of RAN network interface messages.

The following sections includes discussions of various network interface messages in which NG/S1 UL UP Transport Layer Information IE is exchanged. One interface via which NG/S1 UL UP Transport Layer Information IE is exchanged (applicable to the disaggregated gNB in 5G SA and NSA deployments) is F1 interface. The list of F1 network interface messages (corresponding to F1AP procedures) which contain NG/S1 UL UP Transport Layer Information IE is provided below:

(i) UE Context Setup Request message from O-CU to O-DU in UE Context Setup procedure, defined in 3GPP TS 38.473. NG/S1 UL UP Transport Layer Information IE is present in:

DRB to be Setup List
  DRB to be Setup Item IEs
    UL UP TNL Information to be setup List
      UL UP TNL Information to be Setup Item IEs
        UL UP TNL Information
NG/S1 UL UP Transport Layer Information IE is present as a mandatory IE, when at least one Data Radio Bearer (DRB) is setup for the UE while establishing its UE context, over the F1 interface, initiated by the O-CU to the O-DU.

(ii) UE Context Modification Request message from O-CU to O-DU in UE Context Modification procedure, defined in 3GPP TS 38.473. NG/S1 UL UP Transport Layer Information IE is present in:

DRB to be Setup List
  DRB to be Setup Item IEs
    UL UP TNL Information to be setup List
      UL UP TNL Information to be Setup Item IEs
        UL UP TNL Information
DRB to be Modified List
  DRB to be Modified Item IEs
    UL UP TNL Information to be setup List
      UL UP TNL Information to be Setup Item IEs
        UL UP TNL Information
NG/S1 UL UP Transport Layer Information IE is present as a mandatory IE, when at least one Data Radio Bearer (DRB) is modified for the UE while establishing its UE context, over the F1 interface, initiated by the O-CU to the O-DU.

(iii) UE Context Modification Confirm message from O-DU to O-CU in UE Context Modification procedure, defined in 3GPP TS 38.473. NG/S1 UL UP Transport Layer Information IE is present in:
   DRB Modified List
      DRB Modified Item IEs
         UL UP TNL Information to be setup List
            UL UP TNL Information to be Setup Item IEs
            UL UP TNL Information Another interface via which NG/S1 UL UP Transport Layer Information IE is exchanged (applicable to the disaggregated gNB in 5G SA and NSA deployments) is E1 interface. The list of E1 network interface messages (corresponding to E1AP procedures) which contain NG/S1 UL UP Transport Layer Information IE is provided below:

(i) Bearer Context Setup Request message from O-CU-CP to O-CU-UP in Bearer Context Setup procedure, defined in 3GPP TS 38.463. NG/S1 UL UP Transport Layer Information IE is present in:
   CHOICE System
      E-UTRAN>
         DRB To Setup List
            DRB To Setup Item E-UTRAN
               S1 UL UP Transport Layer Information
      NG-RAN>
         PDU Session Resource To Setup List
            PDU Session Resource To Setup Item
               NG UL UP Transport Layer Information NG/S1 UL UP Transport Layer Information IE is present as a mandatory IE, when at least one Data Radio Bearer (DRB) is setup for an LTE UE or when at least one PDU session is setup for a 5G UE while establishing its bearer context, over the E1 interface, initiated by the O-CU-CP to the O-CU-UP.

(ii) Bearer Context Modification Request message from O-CU-CP to O-CU-UP in Bearer Context Modification procedure, defined in 3GPP TS 38.463. NG/S1 UL UP Transport Layer Information IE is present in:
   CHOICE System
      E-UTRAN>
         DRB To Setup List
            DRB To Setup Item E-UTRAN
               S1 UL UP Transport Layer Information
         DRB To Modify List
            DRB To Modify Item E-UTRAN
               S1 UL UP Transport Layer Information
      NG-RAN
         PDU Session Resource To Setup List
            PDU Session Resource To Setup Item
               NG UL UP Transport Layer Information
         PDU Session Resource To Modify List
            PDU Session Resource To Modify Item
               NG UL UP Transport Layer Information NG/S1 UL UP Transport Layer Information IE is present as a mandatory IE, when at least one Data Radio Bearer (DRB) is modified for the UE while establishing its UE context, over the F1 interface, initiated by the O-CU to the O-DU.

Another interface via which NG/S1 UL UP Transport Layer Information IE is exchanged (applicable to both monolithic and disaggregated gNB in 5G SA and NSA deployments) is Xn interface. The list of Xn network interface messages (corresponding to XnAP procedures) which contain NG/S1 UL UP Transport Layer Information IE is provided below:

(i) Handover Request message from O-CU-CP of the source gNB to O-CU-CP of the target gNB in Handover Preparation procedure, defined in 3GPP TS 38.423. NG/S1 UL UP Transport Layer Information IE is present in:
   UE Context Information
      PDU Session Resources To Be Setup List
         PDU Session Resources To Be Setup Item
            UL NG-U UP TNL Information at UPF (ii) Retrieve UE Context Response message in Retrieve UE Context procedure, defined in 3GPP TS 38.423. NG/S1 UL UP Transport Layer Information IE is present in:
   UE Context Information-Retrieve UE Context Response
      PDU Session Resources To Be Setup Item
         PDU Session Resources To Be Setup Item
            UL NG-U UP TNL Information at UPF Another interface via which NG/S1 UL UP Transport Layer Information IE is exchanged (applicable to both monolithic and disaggregated gNB in 5G SA deployment) is NG interface. The list of NG network interface messages (corresponding to NGAP procedures) which contain NG/S1 UL UP Transport Layer Information IE is provided below:

(i) Initial Context Setup Request message from AMF to O-CU-CP in the Initial Context Setup procedure, defined in 3GPP TS 38.413. NG/S1 UL UP Transport Layer Information IE is present in:
   PDU Session Resource Setup Request List
      PDU Session Resource Setup Request Item
         PDU Session Resource Setup Request Transfer
            UL NG-U UP TNL Information (ii) Handover Request message from AMF to O-CU-CP in the UE Context Modification procedure, defined in 3GPP TS 38.413. NG/S1 UL UP Transport Layer Information IE is present in:
   PDU Session Resource Setup List
      PDU Session Resource Setup Item
         Handover Request Transfer
            PDU Session Resource Setup Request Transfer
               UL NG-U UP TNL Information Another interface via which NG/S1 UL UP Transport Layer Information IE is exchanged (applicable to both monolithic and disaggregated gNB in 5G SA deployment, and monolithic eNB in 4G deployment) is X2 interface. The list of X2 network interface messages (corresponding to X2AP procedures) which contain NG/S1 UL UP Transport Layer Information IE is provided below:

(i) SgNB Addition Request message from O-MeNB to O-CU-CP of SgNB in SgNB Addition procedure, defined in 3GPP TS 36.423. NG/S1 UL UP Transport Layer Information IE is present in:
   E-RABs To Be Added List
      E-RABs To Be Added Item
         CHOICE Resource Configuration
            PDCP present in SN
               S1 UL GTP Tunnel Endpoint (ii) SgNB Addition Request message from O-MeNB to O-CU-CP of SgNB in SgNB Addition procedure, defined in 3GPP TS 36.423. NG/S1 UL UP Transport Layer Information IE is present in:
   E-RABs To Be Added List
      E-RABs To Be Added Item
         CHOICE Resource Configuration
            PDCP present in SN
               S1 UL GTP Tunnel Endpoint E-RABs To Be Modified List
　E-RABs To Be Modified Item
　　CHOICE Resource Configuration
　　　PDCP present in SN
　　　　S1 UL GTP Tunnel Endpoint
(iii) Handover Request message from source O-MeNB to target O-MeNB in Handover Preparation procedure, defined in 3GPP TS 36.423. NG/S1 UL UP Transport Layer Information IE is present in:
　UE Context Information
　　E-RABs To Be Setup List
　　　E-RABs To Be Setup Item
　　　　UL GTP Tunnel Endpoint
(iv) Retrieve UE Context Response message from source O-gNB CU-CP to target O-gNB CU-CP in Retrieve UE Context procedure, defined in 3GPP TS 38.423. NG/S1 UL UP Transport Layer Information IE is present in:
　UE Context Information-Retrieve UE Context Response
　　PDU Session Resources To Be Setup List
　　　PDU Session Resources To Be Setup Item
　　　　UL NG-U UP TNL Information at UPF Another interface via which NG/S1 UL UP Transport Layer Information IE is exchanged (applicable to both monolithic and disaggregated gNB in 5G NSA deployment, and monolithic eNB in 4G deployment) is S1 interface. The list of S1 network interface messages (corresponding to S1AP procedures) which contain NG/S1 UL UP Transport Layer Information IE is provided below:
(i) E-RAB Setup Request from MME to O-MeNB in E-RAB Setup procedure, defined in 3GPP TS 36.413. NG/S1 UL UP Transport Layer Information IE is present in:
　E-RAB to be Setup List
　　E-RAB To Be Setup Item IEs
　　　GTP-TEID
(ii) E-RAB Modify Request from MME to O-MeNB in E-RAB Modify procedure, defined in 3GPP TS 36.413. NG/S1 UL UP Transport Layer Information IE is present in:
　E-RAB to be Modified List
　　E-RAB To Be Modified Item IEs
　　　Transport Information
　　　　UL GTP TEID According to another example embodiment of the present disclosure, other RAN network-interface identifiers for the UE are correlated with NG/S1 UL UP Transport Layer Information for its default PDU session and DRB. Some of the example interfaces discussed in connection with this example embodiment include: F1, E1, Xn, NG, X2 and S1.

The RAN UE Identifiers used over the F1 interface for the UE are gNB-CU UE F1AP ID and the gNB-DU UE F1AP ID. These UE identifiers are present in all the UE-associated F1AP network-interface messages, e.g., as discussed in 3GPP TS 38.473. The NG/S1 UL UP Transport Layer Information is present in those F1AP network-interface messages previously elaborated, and must be correlated with the gNB-CU UE F1AP ID and gNB-DU UE F1AP ID IEs extracted from those messages. The NG/S1 UL UP Transport Layer Information must be further correlated with the gNB-CU ID and gNB-DU ID, between which the F1AP messages are exchanged. The gNB-CU ID and gNB-DU ID are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated F1AP network interface message sent between the gNB-CU and the gNB-DU. This correlation is required because the gNB-CU UE F1AP ID and the gNB-DU UE F1AP ID pair is unique within an F1-C interface between a given O-CU and a given O-DU pair at any given point of time. Moreover, this correlation is important because the NG/S1 UL UP Transport Layer Information IE is not present in all UE-associated F1AP network-interface messages. Therefore, this correlation is important in order to maintain the UE states and keep apprised of updates in UE-specific IE values from other F1AP network-interface messages where NG/S1 UL UP Transport Layer Information IE is not present.

The RAN UE Identifiers used over the E1 interface for the UE are gNB-CU-CP UE E1AP ID and the gNB-CU-UP UE E1AP ID. These UE identifiers are present in all the UE-associated E1AP network-interface messages, discussed in 3GPP TS 38.463. The NG/S1 UL UP Transport Layer Information is present in those E1AP network-interface messages previously elaborated, and must be correlated with the gNB-CU-CP UE E1AP ID and gNB-CU-UP UE E1AP ID IEs extracted from those messages. NG/S1 UL UP Transport Layer Information must be further correlated with the gNB-CU-CP ID and gNB-CU-UP ID, between which the E1AP messages are exchanged. The gNB-CU-CP ID and gNB-CU-UP ID are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated E1AP network interface message sent between the gNB-CU-CP and the gNB-CU-UP. This correlation is required because the gNB-CU-CP UE E1AP ID and the gNB-CU-UP UE E1AP ID pair is unique within an E1 interface between the O-CU-CP and the O-CU-UP at any given point of time. Moreover, this correlation is important because the NG/S1 UL UP Transport Layer Information IE is not present in all UE-associated E1AP network-interface messages. Therefore, this correlation is important in order to maintain the UE states and keep apprised of updates in UE-specific IE values from other E1AP network-interface messages where NG/S1 UL UP Transport Layer Information IE is not present.

The RAN UE Identifiers used over the Xn interface for the UE are Source NG-RAN node UE XnAP ID and the Target NG-RAN node UE XnAP ID. These UE identifiers are present in all the UE-associated XnAP network-interface messages, (e.g., as discussed in 3GPP TS 38.423). The NG/S1 UL UP Transport Layer Information is present in those XnAP network-interface messages previously elaborated, and must be correlated with the Source NG-RAN node UE XnAP ID and the Target NG-RAN node UE XnAP ID IEs extracted from those messages. NG/S1 UL UP Transport Layer Information must be further correlated with the Global NG-RAN Node ID of the source and target NG-RAN nodes, between which the XnAP messages are exchanged. The Global NG-RAN Node IDs of the source and target NG-RAN nodes are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated XnAP network interface message sent between the source NG-RAN Node and the target NG-RAN Node. This correlation is required because the Source NG-RAN node UE XnAP ID and the Target NG-RAN node UE XnAP ID pair is unique within an Xn interface between the source NG-RAN Node and the target NG-RAN Node at any given point of time. Moreover, this correlation is important because the NG/S1 UL UP Transport Layer Information IE is not present in all UE-associated XnAP network-interface messages. Therefore, this correlation is important in order to maintain the UE states and keep apprised of updates in UE-specific IE values from other XnAP network-interface messages where NG/S1 UL UP Transport Layer Information IE is not present.

The RAN UE Identifiers used over the NG interface for the UE are AMF UE NGAP ID and the RAN UE NGAP ID. These UE identifiers are present in all the UE-associated NGAP network-interface messages (e.g., as discussed in 3GPP TS 38.413). The NG/S1 UL UP Transport Layer Information is present in those NGAP network-interface messages previously elaborated, and must be correlated with the AMF UE NGAP ID and RAN UE NGAP ID IEs extracted from those messages. NG/S1 UL UP Transport Layer Information must be further correlated with the Global RAN Node ID and the AMF Name/GUAMI, between which the NGAP messages are exchanged. The Global RAN Node ID and the AMF Name/GUAMI are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated NGAP network interface message sent between the AMF Node and the NG-RAN (gNB CU-CP) Node. This correlation is required because the AMF UE NGAP ID and the RAN UE NGAP ID pair is unique within an NG interface between the source AMF Node and the NG-RAN Node at any given point of time. Moreover, this correlation is important because the NG/S1 UL UP Transport Layer Information IE is not present in all UE-associated NGAP network-interface messages. Therefore, this correlation is important in order to maintain the UE states and keep apprised of updates in UE-specific IE values from other NGAP network-interface messages where NG/S1 UL UP Transport Layer Information IE is not present.

The RAN UE Identifiers used over the X2 interface for the UE are MeNB UE X2AP ID and the SgNB UE X2AP ID. These UE identifiers are present in all the UE-associated X2AP network-interface messages (e.g., as discussed in 3GPP TS 36.423). The NG/S1 UL UP Transport Layer Information is present in those X2AP network-interface messages previously elaborated, and must be correlated with the MeNB UE X2AP ID and SgNB UE X2AP ID IEs extracted from those messages. NG/S1 UL UP Transport Layer Information must be further correlated with the Global eNB ID for the master MeNB and the global RAN Node ID for the secondary SgNB CU-CP, between which the X2AP messages are exchanged. The Global eNB ID for the master MeNB and the global RAN Node ID for the secondary SgNB CU-CP are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated X2AP network interface message sent between the master MeNB and the secondary SgNB CU-CP. This correlation is required because the MeNB UE X2AP ID and the SgNB UE X2AP ID pair is unique within an X2 interface between the source MeNB node and the SgNB CU-CP at any given point of time. Moreover, this correlation is important because the NG/S1 UL UP Transport Layer Information IE is not present in all UE-associated X2AP network-interface messages. Therefore, this correlation is important in order to maintain the UE states and keep apprised of updates in UE-specific IE values from other X2AP network-interface messages where NG/S1 UL UP Transport Layer Information IE is not present.

The RAN UE Identifiers used over the S1 interface for the UE are eNB UE S1AP ID and the MME UE S1AP ID. These UE identifiers are present in all the UE-associated S1AP network-interface messages (e.g., as discussed in 3GPP TS 36.413). The NG/S1 UL UP Transport Layer Information is present in those S1AP network-interface messages previously elaborated, and must be correlated with the eNB UE S1AP ID and MME UE S1AP ID IEs extracted from those messages. NG/S1 UL UP Transport Layer Information must be further correlated with the Global eNB ID for the eNB and the MME Name for the MME, between which the S1AP messages are exchanged. The Global eNB ID for the eNB and the MME Name for the MME are obtained from the Network Interface Identifier IE of the RIC Indication Header IE from the E2 Report Indication message sent from the E2 node to the near-RT RIC. The E2 Report Indication message contains the RIC Indication Message IE that further contains the UE-associated S1AP network interface message sent between the eNB and the MME. This correlation is required because the eNB UE S1AP ID and the MME UE S1AP ID pair is unique within an S1 interface between the eNB node and the MME node at any given point of time. Moreover, this correlation is important because the NG/S1 UL UP Transport Layer Information IE is not present in all UE-associated S1AP network-interface messages. Therefore, this correlation is important in order to maintain the UE states and keep apprised of updates in UE-specific IE values from other S1AP network-interface messages where NG/S1 UL UP Transport Layer Information IE is not present.

In this section, the 3GPP-defined procedures for a number of example connectivity and mobility scenarios are discussed in the context of explaining how the example embodiments of the proposed solution are effective in uniquely identifying UEs in the RIC across these different procedures and sessions. More specifically, this section discusses how the NG/S1 UL UP Transport Layer Information IE can be correlated with temporary RAN network-interface UE Identifiers from appropriate network interface messages and how this correlation can be used to map updates in the UE states and associate updated IE values from these messages to individual UEs.

Figure 3:
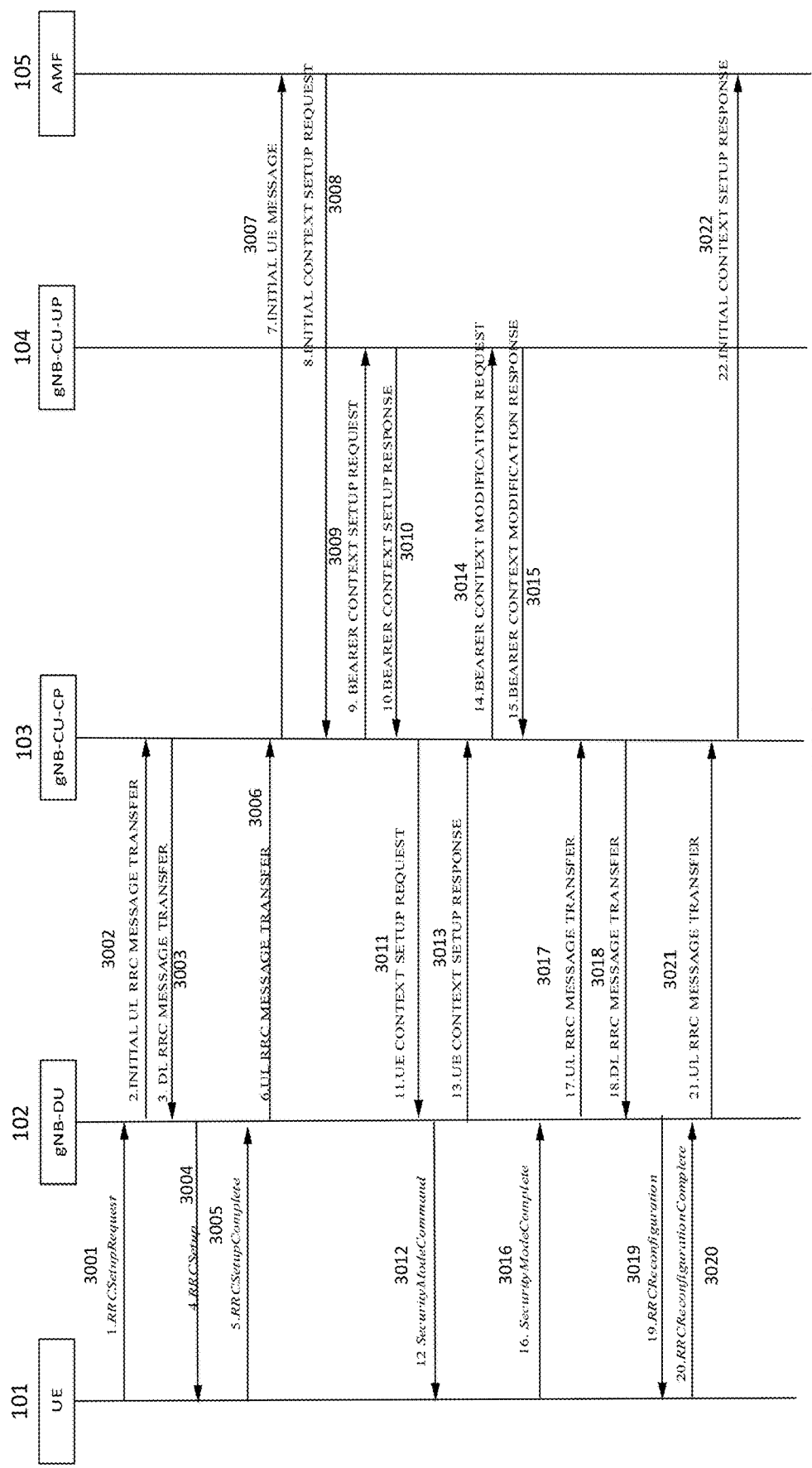
FIG. 3 illustrates the standard 3GPP procedures involved in the call flow for UE's initial access to the RAN.

FIG. 3 illustrates the standard 3GPP procedures involved in the call flow for UE's initial access to the RAN. In the first sequence step 3001, RRC setup request (RRCSetupRequest) message is sent from UE 101 to gNB-DU 102. In the second sequence step 3002, the initial UL RRC message transfer is implemented from gNB-DU 102 to gNB-CU-CP 103. In the third sequence step 3003, DL RRC message transfer is implemented from gNB-CU-CP 103 to gNB-DU 102. In the fourth sequence step 3004, RRC setup (RRCSetup) message is sent from gNB-DU 102 to UE 101. In the fifth sequence step 3005, RRC setup completion (RRCSetupComplete) message is sent from UE 101 to gNB-DU 102. In the sixth sequence step 3006, UL RRC message transfer is implemented from gNB-DU 102 to gNB-CU-CP 103. In the seventh sequence step 3007, initial UE message is transmitted from gNB-CU-CP 103 to AMF 105. In the eighth sequence step 3008, initial context setup request is transmitted from AMF 105 to gNB-CU-CP 103. In the ninth sequence step 3009, bearer context setup request is transmitted from gNB-CU-CP 103 to gNB-CU-UP 104. In the tenth sequence step 3010, bearer context setup response is transmitted from gNB-CU-UP 104 to gNB-CU-CP 103. In the eleventh sequence step 3011, UE context setup request is transmitted from gNB-CU-CP 103 to gNB-DU 102. In the twelfth sequence step 3012, security mode command (SecurityModeCommand) message is transmitted from gNB-DU 102 to UE 101. In the thirteenth sequence step 3013, UE context setup response message is transmitted from gNB-DU 102 to gNB-CU-CP 103. In the fourteenth sequence step 3014, bearer context modification request is transmitted from gNB-CU-CP 103 to gNB-CU-UP 104. In the fifteenth sequence step 3015, bearer context modification response is transmitted from gNB-CU-UP 104 to gNB-CU-CP 103. In the sixteenth sequence step 3016, security mode complete (SecurityModeComplete) message is transmitted from UE 101 to gNB-DU 102. In the seventeenth sequence step 3017, the UL RRC message transfer is implemented from gNB-DU 102 to gNB-CU-CP 103. In the eighteenth sequence step 3018, DL RRC message transfer is implemented from gNB-CU-CP 103 to gNB-DU 102. In the nineteenth sequence step 3019, RRC reconfiguration (RRCReconfiguration) message is sent from gNB-DU 102 to UE 101. In the twentieth sequence step 3020, RRC reconfiguration complete (RRCReconfigurationComplete) message is sent from UE 101 to gNB-DU 102. In the twenty-first sequence step 3021, the UL RRC message transfer is implemented from gNB-DU 102 to gNB-CU-CP 103. In the twenty-second sequence step 3022, initial context setup response message is sent from gNB-CU-CP 103 to AMF 105.

In the above-described call flow illustrated in FIG. 3, the same value for NG/S1 UL UP Transport Layer Information IE is available in (i) the eighth sequence step 3008 from AMF 105 to gNB-CU-CP 103, (ii) the ninth and fourteenth sequence steps 3009 and 3014 in the call flow from gNB-CU-CP 103 to gNB-CU-UP 104, (iii) the eleventh sequence step 3011 in the call flow from gNB CU-CP 103 to gNB-DU 102. The network-interface-specific temporary RAN identifiers for the UE are available in the following sequence steps: AMF UE NGAP ID and RAN UE NGAP ID IEs for NG interface are available in the eighth and twenty-second sequence steps 3008 and 3022; gNB-CU-CP UE E1AP ID and gNB-CU-UP UE E1AP ID IEs for E1 interface are available in the $9^{th}$-$10^{th}$ and $14^{th}$-$15^{th}$ sequence steps 3009, 3010, 3014 and 3015; and gNB-CU-CP UE F1AP ID and gNB-DU UE F1AP ID IEs for F1 interface are available in the sequence $11^{th}$-$13^{th}$, $17^{th}$-$18^{th}$, and $21^{st}$ sequence steps 3011, 3012, 3013, 3017, 3018 and 3021. The above-described network-interface-specific temporary RAN identifiers for the UE are available in all the messages transmitted across the respective network interfaces, and hence these temporary RAN identifiers can be correlated with NG/S1 UL UP Transport Layer Information IE available in the various sequence steps described above, in order to map updates in UE states/IEs with the identity of individual UEs.

Figure 4:
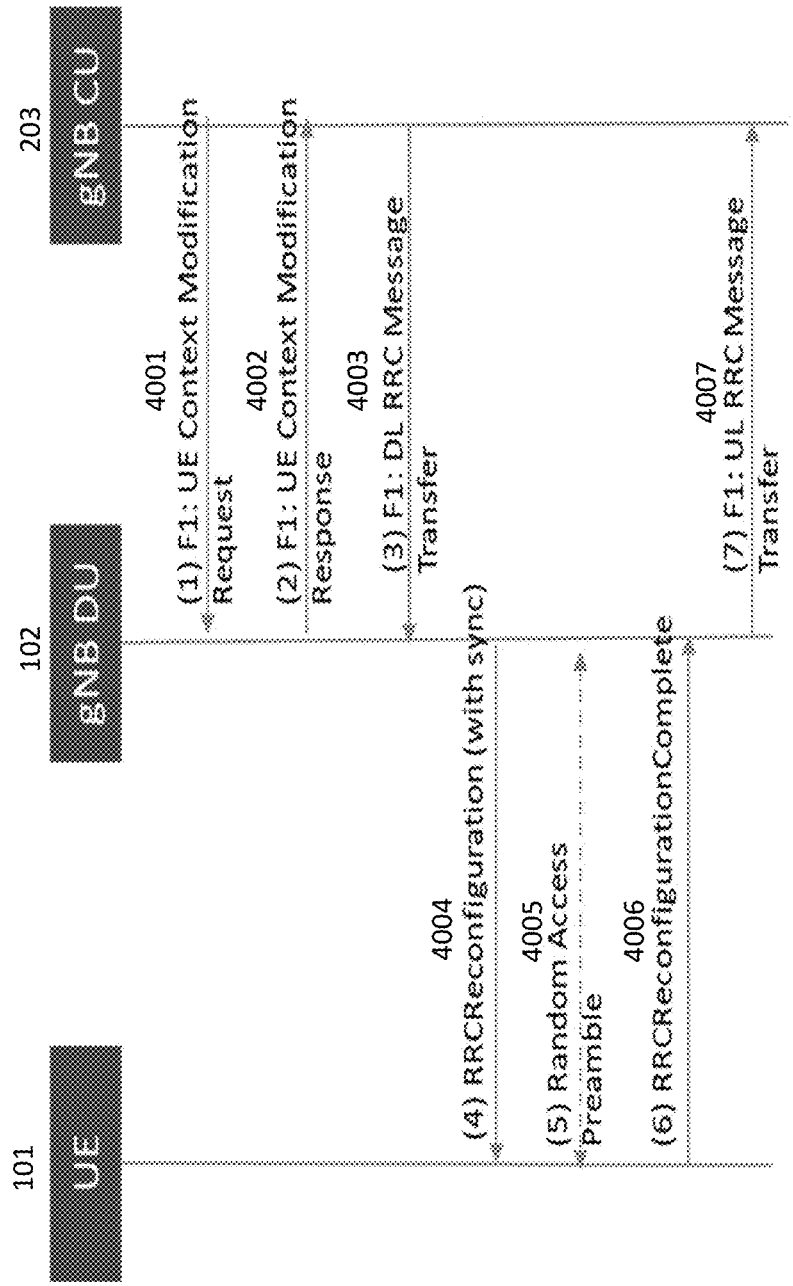
FIG. 4 illustrates the standard 3GPP procedures involved in the call flow for intra-CU, intra-DU, inter-cell handover for individual UEs.

FIG. 4 illustrates the standard 3GPP procedures involved in the call flow for intra-CU, intra-DU, inter-cell handover for individual UEs. In the first sequence step 4001, UE context modification request is transmitted over F1 interface from gNB-CU 203 to gNB-DU 102. In the second sequence step 4002, UE context modification response is transmitted over F1 interface from gNB-DU 102 to gNB-CU 203. In the third sequence step 4003, DL RRC message transfer is implemented over F1 interface from gNB-CU 203 to gNB-DU 102. In the fourth sequence step 4004, RRC reconfiguration (RRCReconfiguration) (e.g., with synchronization) message is sent from gNB-DU 102 to UE 101. In the fifth sequence step 4005, Random Access Preamble is exchanged between UE 101 and gNB-DU 102. In the sixth sequence step 4006, RRC reconfiguration completion (RRCReconfigurationComplete) message is sent from UE 101 to gNB-DU 102. In the seventh sequence step 4007, UL RRC message transfer is implemented over F1 interface from gNB-DU 102 to gNB-CU 203.

The NG/S1 UL UP Transport Layer Information IE can be available in either (i) the first sequence step 4001 (UE context modification request) of the call flow illustrated in FIG. 4, or (ii) the UE context setup request message (sequence step 4011 in FIG. 3) during the UE context setup procedure initiated earlier, and then later correlated with the UE context modification procedure (sequence steps 4001 and 4002 in FIG. 4). The same value for the IE is available in all the above-mentioned sequence steps in the call flow. The network-interface-specific temporary RAN identifiers for the UE, gNB-CU-CP UE F1AP ID and gNB-DU UE F1AP ID IEs for the F1 interface, are available in the first, second, third and seventh sequence steps 4001-4003 and 4007. These network-interface-specific temporary RAN identifiers for the UE can be correlated with the NG/S1 UL UP Transport Layer Information IE available as mentioned in the beginning of this paragraph.

Figure 5:
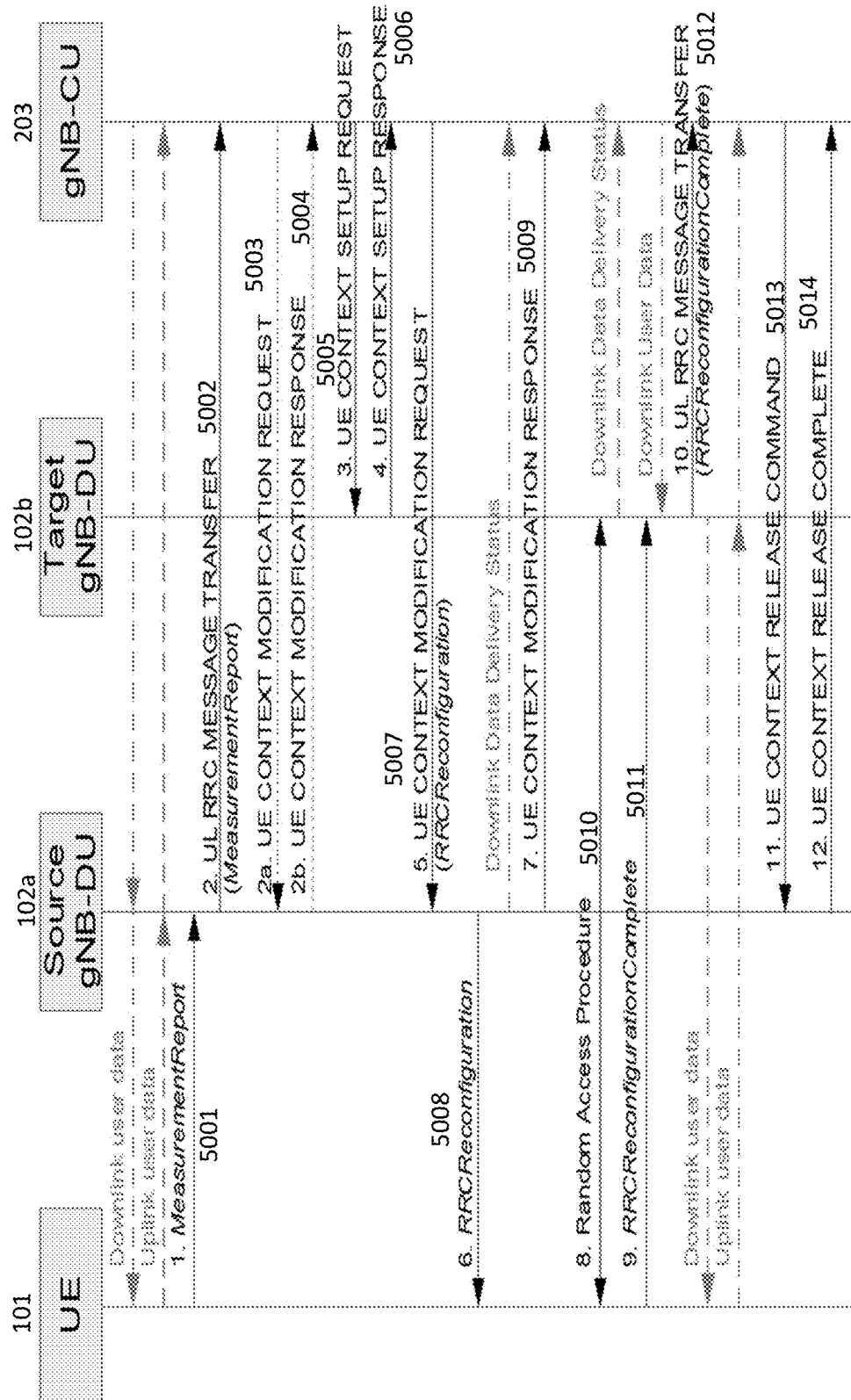
FIG. 5 illustrates the standard 3GPP procedures involved in the call flow for intra-CU, inter-DU, inter-cell handover for individual UEs.

FIG. 5 illustrates the standard 3GPP procedures involved in the call flow for intra-CU, inter-DU, inter-cell handover for individual UEs. As shown at top in FIG. 5, downlink user data and uplink user data are being exchanged among UE 101, source gNB-DU 102a, target gNB-DU 102b, and gNB-CU 203. In the first sequence step 5001, measurement report (MeasurementReport) message 5001 is transmitted from UE 101 to source gNB-DU 102a. In the second sequence step 5002, UL RRC message transfer (of MeasurementReport) takes place from source gNB-DU 102a to gNB-CU 203. In the third sequence step 5003, UE context modification request message is sent from gNB-CU 203 to source gNB-DU 102a. In the fourth sequence step 5004, UE context modification response message is sent from source gNB-DU 102a to gNB-CU 203. In the fifth sequence step 5005, UE context setup request message is sent from gNB-CU 203 to target gNB-DU 102b. In the sixth sequence step 5006, UE context setup response message is sent from target gNB-DU 102b to gNB-CU 203. In the seventh sequence step 5007, UE context modification request (for implementing RRC reconfiguration) is sent from gNB-CU 2003 to source gNB-DU 102a. In the eighth sequence step 5008, RRC reconfiguration (RRCReconfiguration) message is sent from source gNB-DU 102a to UE 101. Following a DL data delivery status message sent from source gNB-DU 102a to gNB-CU 203, UE context modification response message is sent from source gNB-DU 102a to gNB-CU 203 in the ninth sequence step 5009. In the tenth sequence step 5010, random access procedure is performed between UE 101 and target gNB-DU 102b. Following a DL data delivery status message sent from target gNB-DU 102b to gNB-CU 203, RRC reconfiguration completion (RRCReconfigurationComplete) message is sent from UE 101 to target gNB-DU 102b in the eleventh sequence step 5011. Following a DL user data transmission from gNB-CU 203 to target gNB-DU 102b, UL RRC message transfer (of RRCReconfigurationComplete) is implemented from target gNB-DU 102b to gNB-CU 203 in the twelfth sequence step 5012. After exchange of DL user data (from target gNB-DU 102b to UE) and UL user data (from UE 101 to target gNB-DU 102b), UE context release command 5013 is transmitted from gNB-CU 5013 to source gNB-DU 102a in the thirteenth sequence step 5013. In the fourteenth process sequence step 5014, UE context release complete message 5014 is transmitted from source gNB-DU 102a to gNB-CU 203.

In the call flow shown in FIG. 5, the NG/S1 UL UP Transport Layer Information IE is available in (i) UE context setup request (sequence step 5005) in the call flow from gNB-CU 2003 to target gNB-DU 102b, and (ii) UE context modification request (sequence step 5007) in the call flow from gNB-CU 203 to source gNB-DU 102a. The same value for the IE is available in the above-mentioned sequence steps in the call flow. The network-interface-specific temporary RAN identifiers for the UE, gNB-CU-CP UE F1AP ID and gNB-DU UE F1AP ID IEs corresponding to the two F1 network interfaces (gNB-CU to source DU, and gNB-CU to target DU) are available in the call flow sequence steps 5002-5007 and 5009. These network-interface-specific temporary RAN identifiers for the UE can be correlated with the NG/S1 UL UP Transport Layer Information IE available as mentioned in the beginning of this paragraph.

Figure 6:
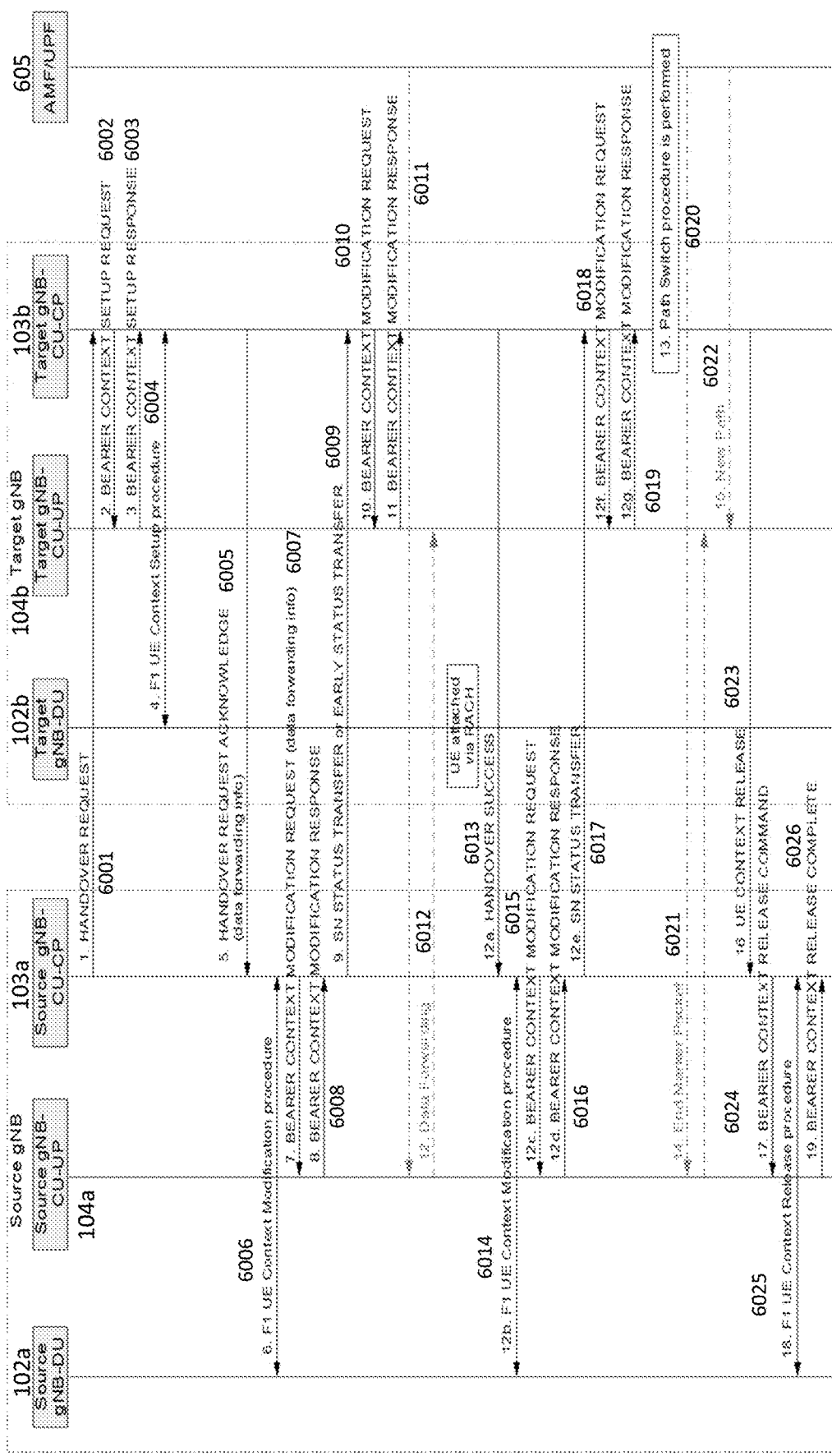
FIG. 6 illustrates the standard 3GPP procedures involved in the call flow for inter-CU handover for individual UEs.

FIG. 6 illustrates the standard 3GPP procedures involved in the call flow for inter-CU-CP handover for individual UEs. In the first sequence step 6001, a handover request is sent from source gNB-CU-CP 103a to target gNB-CU-CP 103b. In the second sequence step 6002, bearer context setup request is sent from target gNB-CU-CP 103b to target gNB-CU-UP 104b. In the third sequence step 6003, bearer context setup response is sent to target gNB-CU-CP 103b from target gNB-CU-UP 104b. In the fourth sequence step 6004, UE context setup procedure is implemented between target gNB-DU 102b and target gNB-CU-CP 103b over F1 interface. In the fifth sequence step 6005, a handover request acknowledge message (including data forwarding information) is sent to source gNB-CU-CP 103a from target gNB-CU-CP 103b. In the sixth sequence step 6006, UE context modification procedure is implemented between source gNB-DU 102a and source gNB-CU-CP 103a over F1 interface. In the seventh sequence step 6007, bearer context modification request (including data forwarding information) is sent from source gNB-CU-CP 103a to source gNB-CU-UP 104a. In the eighth sequence step 6008, bearer context modification response is sent to source gNB-CU-CP 103a from source gNB-CU-UP 104a. In the ninth sequence step 6009, a (PDCP) sequence number (SN) status transfer or early status transfer procedure is initiated from source gNB-CU-CP 103a to target gNB-CU-CP 103b. In the tenth sequence step 6010, bearer context modification request is sent from target gNB-CU-CP 103b to target gNB-CU-UP 104b. In the eleventh sequence step 6011, bearer context modification response is sent to target gNB-CU-CP 103b from target gNB-CU-UP 104b. In the twelfth sequence step 6012, data forwarding occurs, from AMF/UPF 605 to source gNB-CU-UP 104a, and then from source gNB-CU-UP 104a to target gNB-CU-UP 104b.

At this point in the call flow shown in FIG. 6, UE is attached via RACH. In the thirteenth sequence step 6013, a handover success message is sent to source gNB-CU-CP 103a from target gNB-CU-CP 103b. In the fourteenth sequence step 6014, UE context modification procedure is implemented between source gNB-DU 102a and source gNB-CU-CP 103a over F1 interface. In the fifteenth sequence step 6015, bearer context modification request is sent from source gNB-CU-CP 103a to source gNB-CU-UP 104a. In the sixteenth sequence step 6016, bearer context modification response is sent to source gNB-CU-CP 103a from source gNB-CU-UP 104a. In the seventeenth sequence step 6017, a (PDCP) sequence number (SN) status transfer is initiated from source gNB-CU-CP 103a to target gNB-CU-CP 103b. In the eighteenth sequence step 6018, bearer context modification request is sent from target gNB-CU-CP 103b to target gNB-CU-UP 104b. In the nineteenth sequence step 6019, bearer context modification response is sent to target gNB-CU-CP 103b from target gNB-CU-UP 104b. In the twentieth sequence step 6020, path switch procedure is performed between target gNB-CU-CP 103b and AMF/UPF 605. In the twenty-first sequence step 6021, end marker packet forwarding occurs, from AMF/UPF 605 to source gNB-CU-UP 104a, and then from source gNB-CU-UP 104a to target gNB-CU-UP 104b. In the twenty-second sequence step 6022, new path message is sent from AMF/UPF 605 to target gNB-CU-UP 104b. In the twenty-third sequence step 6023, UE context release message is sent to source gNB-CU-CP 103a from target gNB-CU-CP 103b. In the twenty-fourth sequence step 6024, bearer context release command is sent from source gNB-CU-CP 103a to source gNB-CU-UP 104a. In the twenty-fifth sequence step 6025, UE context release procedure is implemented between source gNB-DU 102a and source gNB-CU-CP 103a over F1 interface. In the twenty-sixth sequence step 6026, bearer context release complete message is sent to source gNB-CU-CP 103a from source gNB-CU-UP 104a.

In the call flow shown in FIG. 6, the NG/S1 UL UP Transport Layer Information IE is available in (i) sequence step 6001 in the call flow from source gNB-CU-CP 103a to target gNB-CU-CP 103b, (ii) sequence steps 6002-6003 in the call flow from target gNB-CU-CP 103b to target gNB-CU-UP 104b, and (iii) sequence steps 6007, 6008, 6010, 6011, 6015, 6016, 6018, and 6019. The same value for the IE is available in all the above-mentioned sequence steps in the call flow. The network-interface-specific temporary RAN identifiers for the UE, source NG-RAN node UE XnAP ID reference and target NG-RAN node UE XnAP ID reference corresponding to the Xn network interface are available in the call flow sequence step 6001; the gNB-CU-CP UE E1AP ID and the gNB-CU-UP UE E1AP ID between the target gNB-CU-CP 103b and target gNB-CU-UP 104b nodes are available in sequence steps 6002, 6003, 6010, 6011, 6018 and 6019; and the gNB-CU-CP UE E1AP ID and the gNB-CU-UP UE E1AP ID between the source gNB-CU-UP 104a and the source gNB-CU-CP 103a nodes are available in sequence steps 6007, 6008, 6015, 6016, 6024 and 6026. The RAN UE IDs, specific to the F1AP network interface between the target gNB-CU-CP 103b and target gNB-DU 102b, containing the gNB-CU UE F1AP ID and gNB-DU UE F1AP ID IE, are exchanged in sequence step 6004, while the gNB-CU UE F1AP ID and the gNB-DU UE F1AP ID IEs specific to the F1 interface between the source gNB-CU-CP 103a and source gNB-DU 102a are exchanged in sequence steps 6006, 6014 and 6025. These network-interface-specific temporary RAN identifiers for the UE can be correlated with the NG/S1 UL UP Transport Layer Information IE available as mentioned in the beginning of this paragraph.

Figure 7:
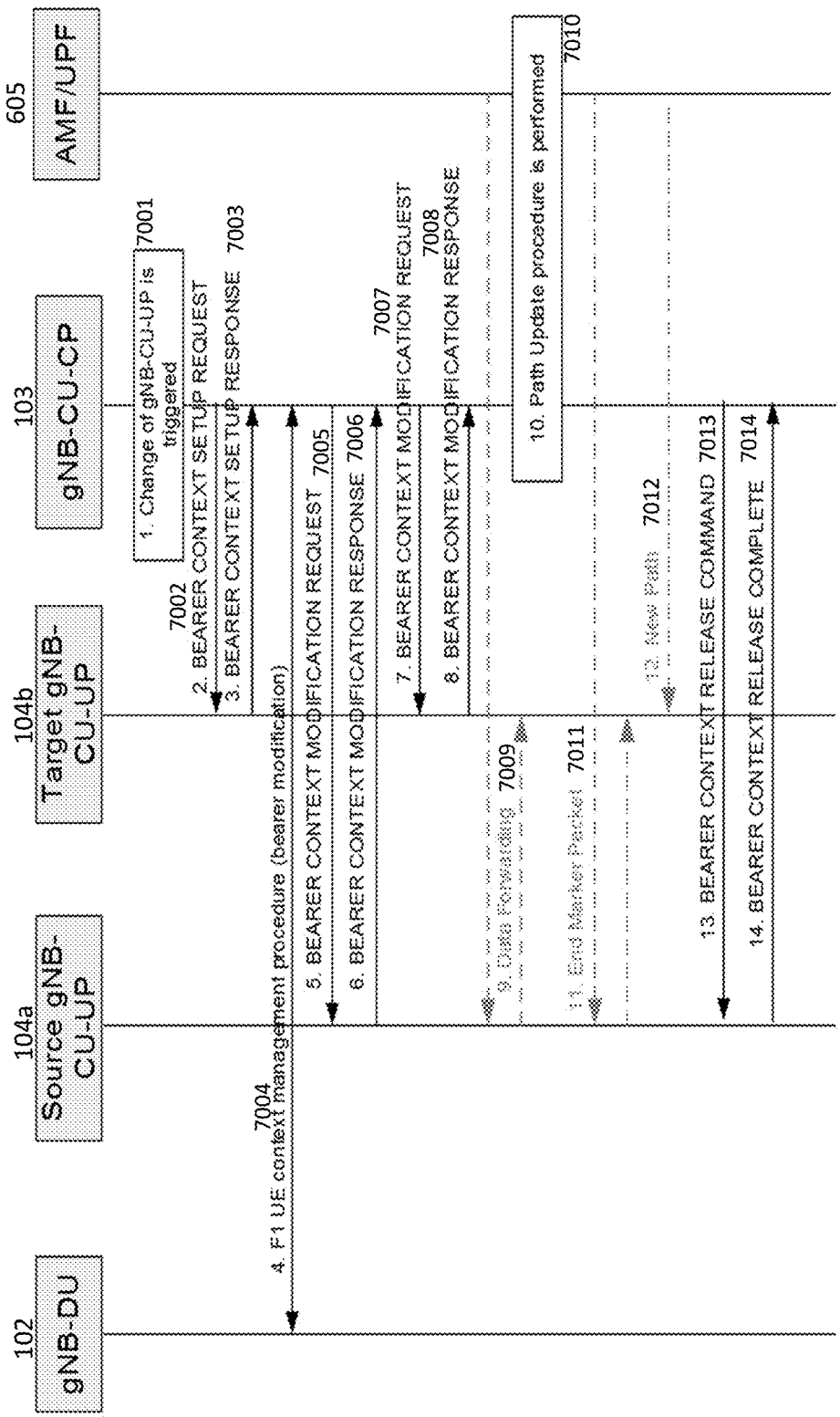
FIG. 7 illustrates the standard 3GPP procedure involved in the call flow for inter-CU-UP handover for individual UEs.

FIG. 7 illustrates the standard 3GPP procedure involved in the call flow for inter-CU-UP handover for individual UEs. In the first sequence step 7001, a change of gNB-CU-UP is triggered by gNB-CU-CP 103. In second sequence step 7002, bearer context setup request is sent from gNB-CU-CP 103 to target gNB-CU-UP 104b. In the third sequence step 7003, bearer context setup response is sent to gNB-CU-CP 103 from target gNB-CU-UP 104b. In the fourth sequence step 7004, UE context management procedure for bearer modification is implemented between gNB-DU 102 and gNB-CU-CP 103 over F1 interface. In the fifth sequence step 7005, bearer context modification request is sent from gNB-CU-CP 103 to source gNB-CU-UP 104a. In the sixth sequence step 7006, bearer context modification response is sent to gNB-CU-CP 103 from source gNB-CU- UP 104a. In the seventh sequence step 7007, bearer context modification request is sent from gNB-CU-CP 103 to target gNB-CU-UP 104b. In the eighth sequence step 7008, bearer context modification response is sent to gNB-CU-CP 103 from target gNB-CU-UP 104b. In the ninth sequence step 7009, data forwarding occurs, from AMF/UPF 605 to source gNB-CU-UP 104a, and then from source gNB-CU-UP 104a to target gNB-CU-UP 104b. In the tenth sequence step 7010, path update procedure is performed between gNB-CU-CP 103 and AMF/UPF 605. In the eleventh sequence step 7011, end marker packet forwarding occurs, from AMF/UPF 605 to source gNB-CU-UP 104a, and then from source gNB-CU-UP 104a to target gNB-CU-UP 104b. In the twelfth sequence step 7012, new path message is sent from AMF/UPF 605 to target gNB-CU-UP 104b. In the thirteenth sequence step 7013, bearer context release command is sent from gNB-CU-CP 103 to source gNB-CU-UP 104a. In the fourteenth sequence step 7014, bearer context release complete message is sent to gNB-CU-CP 103 from source gNB-CU-UP 104a.

In the call flow shown in FIG. 7, the NG/S1 UL UP Transport Layer Information IE (i) is available in sequence step 7002 in the call flow from gNB-CU-CP 103 to target gNB-CU-UP 104b, and (ii) can be available in sequence step 7005 in the call flow from gNB-CU-CP 103 to the source gNB-CU-UP 104a and in sequence 7007 in the call flow from gNB-CU-CP 103 to the target gNB-CU-UP 104b. The same value for the IE is available in all the above-mentioned sequence steps in the call flow. The network-interface-specific temporary RAN identifiers for the UE, e.g., gNB-CU-CP UE E1AP ID and gNB-CU-UP UE E1AP ID IEs for the E1 interface between the gNB-CU-CP 103 and the target gNB CU-UP 104b are exchanged in sequence steps 7002, 7003, 7007 and 7008; the gNB-CU-CP UE E1AP ID and the gNB CU-UP UE E1AP ID IEs for the E1 interface between the gNB-CU-CP 103 and the source gNB-CU-UP 104a are exchanged in sequence steps 7005, 7006, 7013 and 7014; and the gNB-CU UE F1AP ID and the gNB-DU UE F1AP ID are available in sequence step 7004. These network-interface-specific temporary RAN identifiers for the UE can be correlated with the NG/S1 UL UP Transport Layer Information IE available as mentioned in the beginning of this paragraph.

Figure 8:
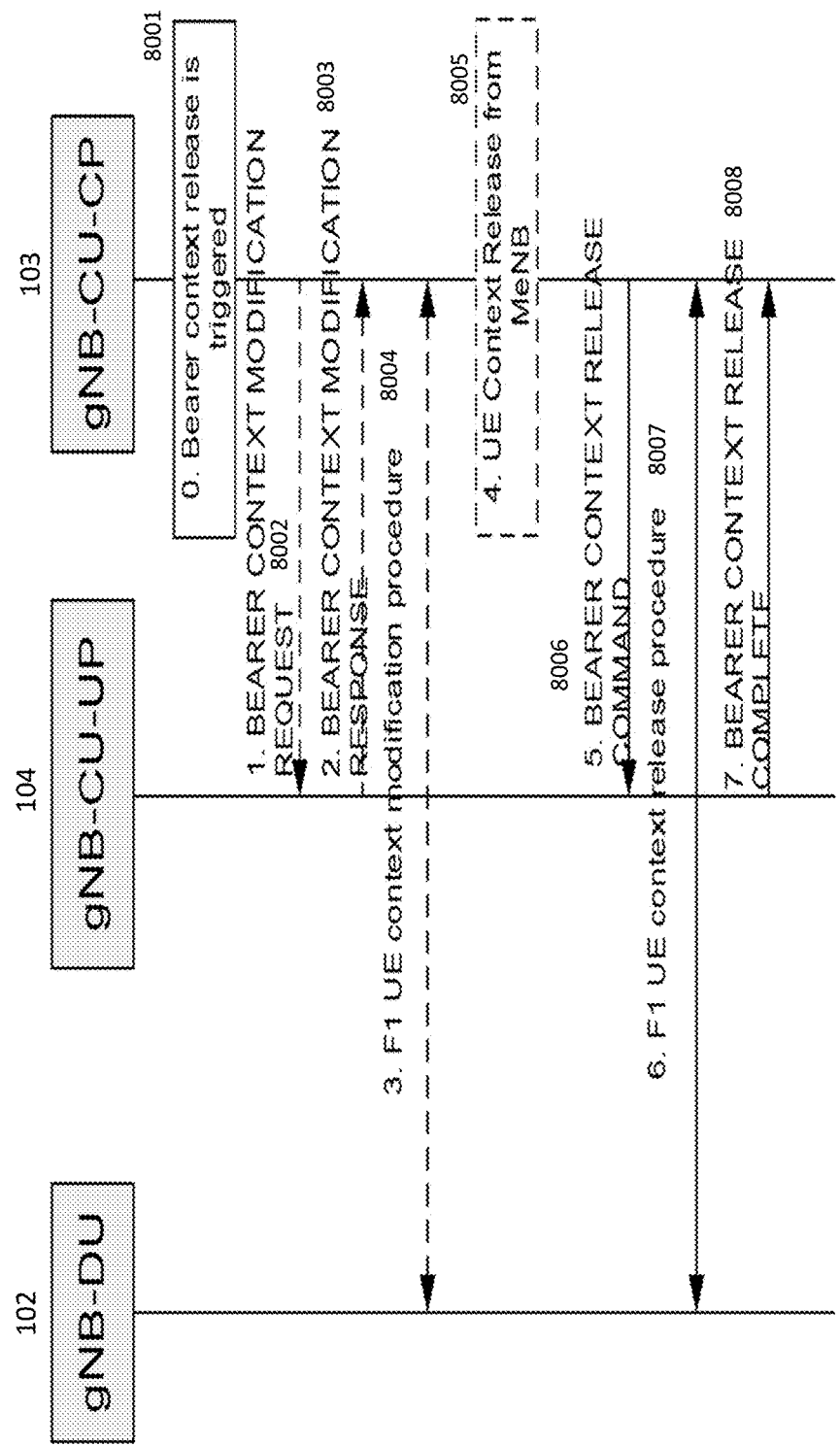
FIG. 8 illustrates the standard 3GPP procedure involved in the call flow for UE Context Release.

FIG. 8 illustrates the standard 3GPP procedure involved in the call flow for UE Context Release. In the first sequence step 8001, bearer context release is triggered by gNB-CU-CP 103. In second sequence step 8002, bearer context modification request is sent from gNB-CU-CP 103 to gNB-CU-UP 104. In the third sequence step 8003, bearer context modification response is sent to gNB-CU-CP 103 gNB-CU-UP 104. In the fourth sequence step 8004, UE context modification procedure is implemented between source gNB-DU 102 and gNB-CU-CP 103 over F1 interface. In the fifth sequence step 8005, UE context release from MeNB is implemented at gNB-CU-CP 103. In the sixth sequence step 8006, bearer context release command is sent from gNB-CU-CP 103 to gNB-CU-UP 104. In the seventh sequence step 8007, UE context release procedure is implemented between gNB-DU 102 and gNB-CU-CP 103 over F1 interface. In the eighth sequence step 8008, bearer context release complete message is sent to gNB-CU-CP 103 from gNB-CU-UP 104.

In the call flow shown in FIG. 8, the NG/S1 UL UP Transport Layer Information IE can be available in either (i) sequence steps 8002 and 8004, or (ii) the Bearer Context Setup Request message during the Bearer Context Setup procedure initiated earlier (FIG. 7, sequence steps 7002 and 7003), and then later correlated with the Bearer Context Modification procedure (FIG. 8, sequence steps 8002 and 8003). The same value for the IE is available in all the above-mentioned sequence steps in the call flow. The network-interface-specific temporary RAN identifiers for the UE, e.g., gNB-CU-CP UE E1AP ID and gNB-CU-UP UE E1AP ID IE IDs for the E1 interface between the gNB-CU-CP 103 and the gNB CU-UP 104 are exchanged in sequence steps 8002, 8003, 8006, 8007 and 8008, and the gNB-CU UE F1AP ID and the gNB DU UE F1AP ID IEs for the F1 interface between the gNB-CU-CP 103 and the gNB-DU 102 are exchanged in sequence steps 8004 and 8007. These network-interface-specific temporary RAN identifiers for the UE can be correlated with the NG/S1 UL UP Transport Layer Information IE available as mentioned in the beginning of this paragraph. It should be noted that, when the same UE connects the next time to the same gNB-CU and gNB-DU pair and/or to the same gNB-CU-CP and gNB-CU-UP pair, the value for the NG/S1 UL UP Transport Layer Information IE would be retained, even as the network-interface-specific temporary RAN UE identifiers would be assigned different values from the previous connection instance.

Figure 9A:
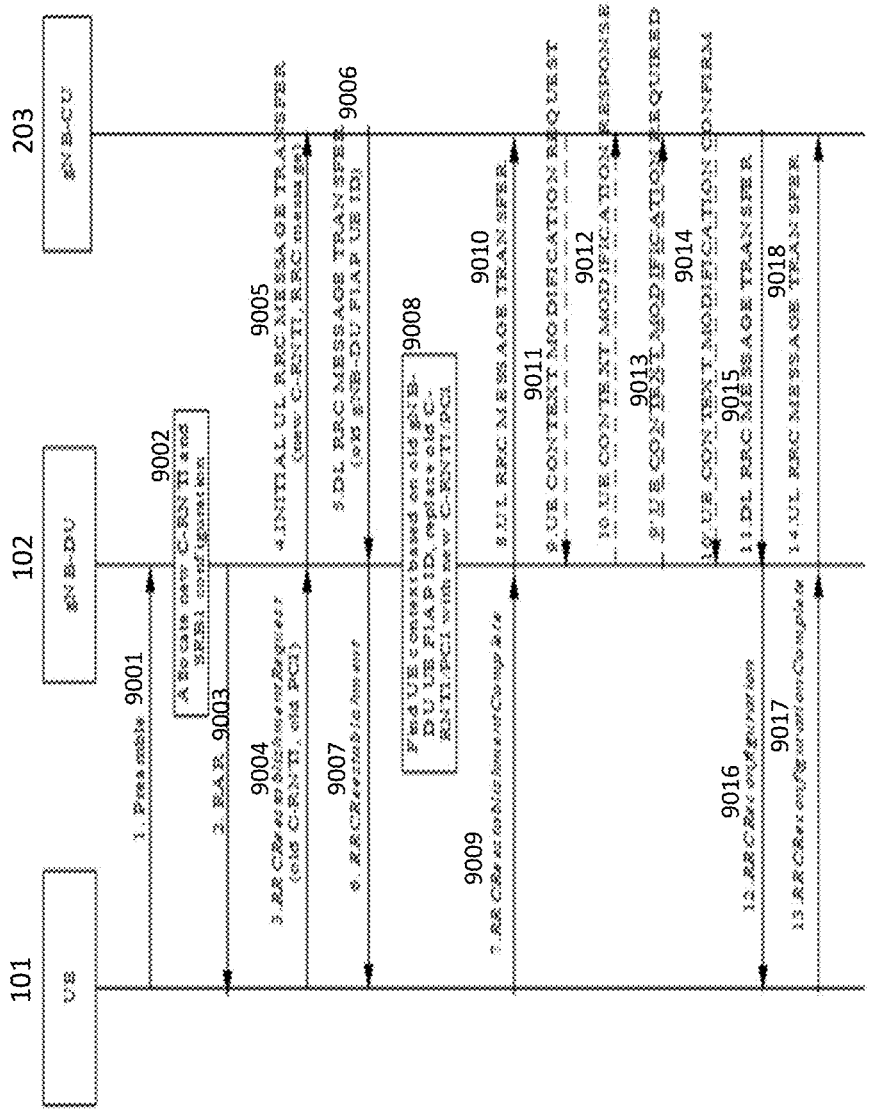
FIG. 9a illustrates the standard 3GPP procedure involved in the call flow between gNB-CU 203 and gNB-DU 102 for RRC reestablishment.

FIG. 9a illustrates the standard 3GPP procedure involved in the call flow between gNB-CU 203 and gNB-DU 102 for RRC reestablishment. In the first sequence step 9001, preamble is sent from UE 101 to gNB-DU 102. In the second sequence step 9002, new C-RNTI is allocated and SRB1 configuration is implemented by gNB-DU 102. In the third sequence step 9003, random access response (RAR) is sent from gNB-DU 102 to UE 101. In the fourth sequence step 9004, RRC reestablishment request (RRCReestablishmentRequest) message (containing old C-RNTI and old PCI) is sent from UE 101 to gNB-DU 102. In the fifth sequence step 9005, initial UL RRC message transfer (containing new C-RNTI and RRC message) is implemented by gNB-DU 102 to gNB-CU 203. In the sixth sequence step 9006, DL RRC message transfer (containing old gNB-DU F1AP UE ID) is implemented by gNB-CU 203 to gNB-DU 102. In the seventh sequence step 9007, RRC reestablishment (RRCReestablishment) message is sent from gNB-DU 102 to UE 101. In the eighth sequence step 9008, gNB-DU 102 retrieves UE context based on old gNB-DU UE F1AP ID, and replaces old C-RNTI/PCI with new C-RNTI/PCI. In the ninth sequence step 9009, RRC reestablishment complete (RRCReestablishmentComplete) message is sent to gNB-DU 102 from UE 101. In the tenth sequence step 9010, gNB-DU 102 encapsulates the RRC message in UL RRC MESSAGE TRANSFER message and sends it to gNB-CU 203. In the eleventh sequence step 9011, gNB-CU 203 triggers UE context modification procedure by sending UE CONTEXT MODIFICATION REQUEST to gNB-DU 102. In the sequence step 9012, gNB-DU 102 responds with UE CONTEXT MODIFICATION RESPONSE message to gNB-CU 203. In the sequence step 9013, gNB-DU 102 triggers UE context modification procedure by sending UE CONTEXT MODIFICATION REQUIRED message to gNB-CU 203. In the sequence step 9014, gNB-CU 203 responds with UE CONTEXT MODIFICATION CONFIRM message to gNB-DU 102. In the sequence step 9015, gNB-CU 203 includes RRCReconfiguration message into DL RRC MESSAGE TRANSFER message and transmits it to gNB-DU 102. In the sequence step 9016, gNB-DU 102 forwards RRCReconfiguration message to UE 101. In the sequence step 9017, UE 101 sends RRCReconfigurationComplete message to gNB-DU 102. In the sequence step 9018, gNB-DU 102 forwards RRCReconfigurationComplete message as part of UL RRC MESSAGE TRANSFER message to the gNB-CU 203.

Figure 9B:
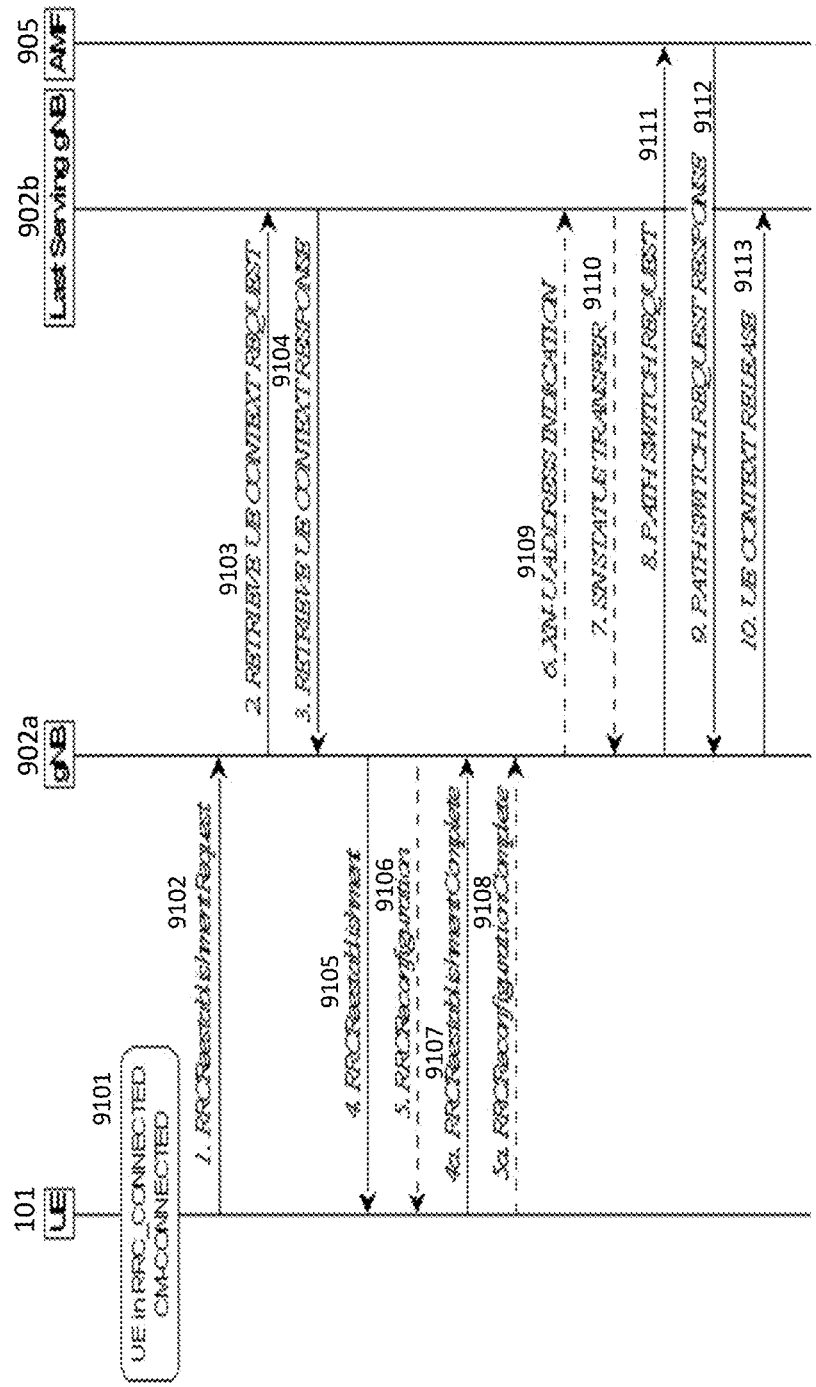
FIG. 9b illustrates the standard 3GPP procedure involved in the call flow between source (last serving) gNB 902b and target gNB 902a for RRC reestablishment.

FIG. 9b illustrates the standard 3GPP procedure involved in the call flow between source (last serving) gNB 902b and target gNB 902a for RRC reestablishment. In the first sequence step 9101, UE is in RRC-connected state and CM-connected state. In the second sequence step 9102, RRCReestablishmentRequest message is sent by UE 101 to gNB 902a. In the third sequence step 9103, RETRIEVE UE CONTEXT REQUEST message is sent by gNB 902a to the last serving gNB 902b. In the fourth sequence step 9104, gNB 902b sends RETRIEVE UE CONTEXT RESPONSE message to gNB 902a. In the fifth sequence step 9105, gNB 902a sends RRCReestablishment message to UE 101. In the sixth sequence step 9106, gNB 902a sends RRCReconfiguration message to UE 101. In the seventh sequence step 9107, RRCReestablishmentComplete message is sent by UE 101 to gNB 902a. In the eighth sequence step 9108, UE 101 sends RRCReconfigurationComplete message to gNB 902a. In the ninth sequence step 9109, gNB 902a sends XN-U ADDRESS INDICATION message to gNB 902b. In the tenth sequence step 9110, gNB 902b sends SN STATUS TRANSFER message to gNB 902a. In the eleventh sequence step 9111, gNB 902a sends PATH SWITCH REQUEST message to AMF 905. In the twelfth sequence step 9112, AMF 905 sends PATH SWITCH REQUEST RESPONSE message to gNB 902a. In the thirteenth sequence step 9113, gNB 902a sends UE CONTEXT RELEASE message to gNB 902b.

In the above-described call flows illustrated in FIGS. 9a and 9b, the NG/S1 UL UP Transport Layer Information IE can be available either in (i) sequence step 9104 of the call flow shown in FIG. 9b, or (ii) sequence step 9011 of the call flow shown in FIG. 9a. The same value for the IE is available in the above-mentioned sequence steps in the call flows. The network-interface-specific temporary RAN identifiers for the UE, e.g., gNB-CU UE F1AP ID and gNB-DU UE F1AP ID IEs for the F1 interface between the gNB-CU 203 and gNB-DU 102 are exchanged in sequence steps 9005, 9006, 9010-9015 and 9018 of FIG. 9a; and the source NG-RAN node UE XnAP ID reference and the target NG-RAN node UE XnAP ID reference IEs for the Xn interface between the source gNB-CU (of gNB 902b) and target gNB-CU (of gNB 902a) are exchanged in sequence steps 9103, 9104, 9109, 9110, and 9113 in the call flow of FIG. 9b. These network-interface-specific temporary RAN identifiers for the UE can be correlated with the NG/S1 UL UP Transport Layer Information IE available as mentioned in the beginning of this paragraph.

Figure 10A:
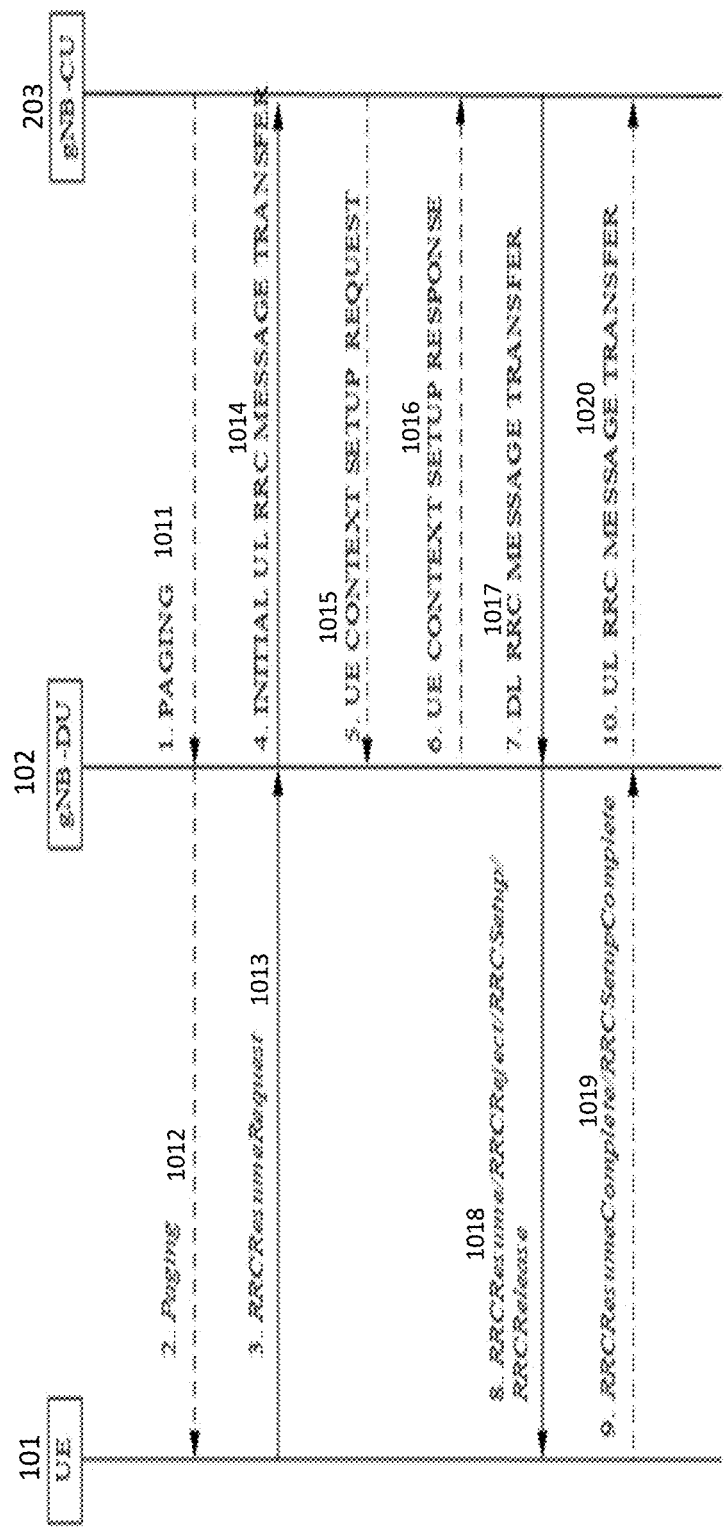
FIG. 10a illustrates the standard 3GPP procedure involved in the call flow between gNB-CU and gNB-DU for transition of RRC states from RRC_INACTIVE to RRC CONNECTED for the UE.

FIG. 10a illustrates the standard 3GPP procedure involved in the call flow between gNB-CU and gNB-DU for transition of RRC states from RRC_INACTIVE to RRC_CONNECTED for the UE. In the first sequence step 1011, gNB-CU 203 sends PAGING message to the gNB-DU 102 (e.g., when data is received). In the second sequence step 1012, gNB-DU 102 sends Paging message to UE 101. In the third sequence step 1013, UE 101 sends RRCResumeRequest message to gNB-DU 102. In the fourth sequence step 1014, gNB-DU 102 includes RRCResumeRequest in INITIAL UL RRC MESSAGE TRANSFER message sent to gNB-CU 203. In the fifth sequence step 1015, gNB-CU 203 sends UE CONTEXT SETUP REQUEST message to gNB-DU 102. In the sixth sequence step 1016, gNB-DU 102 responds by sending UE CONTEXT SETUP RESPONSE message to gNB-CU 203. In the seventh sequence step 1017, gNB-CU 203 sends DL RRC MESSAGE TRANSFER message (which encapsulates RRCResume/RRCSetup/RRCReject/RRCRelease message) to gNB-DU 102. In the eighth sequence step 1018, gNB-DU 102 forwards RRCResume/RRCSetup/RRCReject/RRCRelease message to the UE 101. In the ninth sequence step 1019, UE 101 sends RRCResumeComplete/RRCSetupComplete message to gNB-DU 102. In the eleventh sequence step 1020, gNB-DU 102 encapsulates RRC in UL RRC MESSAGE TRANSFER message sent to gNB-CU 203.

Figure 10B:
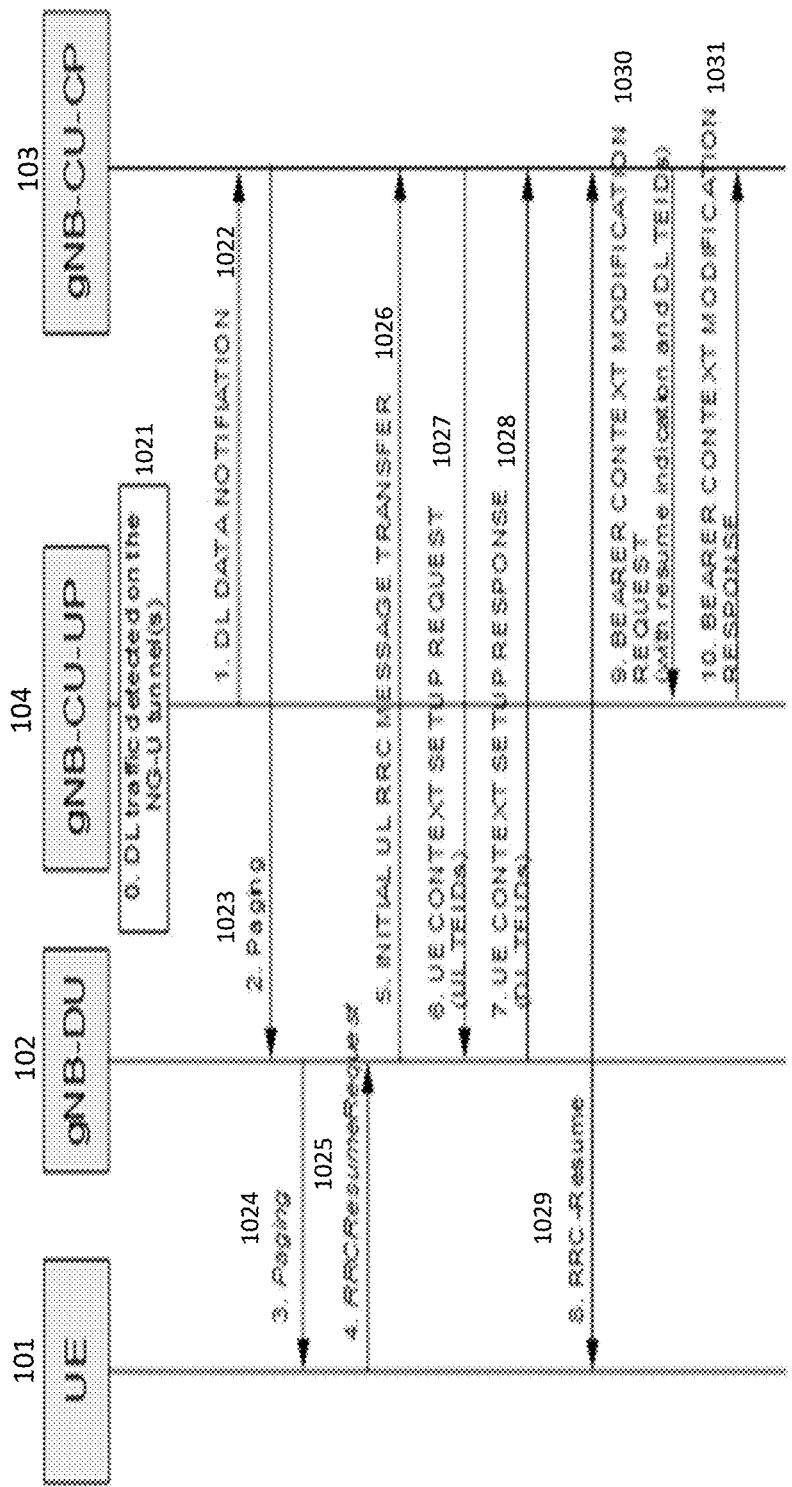
FIG. 10b illustrates the standard 3GPP procedure involved in the call flow among gNB-DU, gNB-CU-UP and gNB-CU-CP for transition of RRC states from RRC_INACTIVE to RRC_CONNECTED for the UE.

FIG. 10b illustrates the standard 3GPP procedure involved in the call flow among gNB-DU, gNB-CU-UP and gNB-CU-CP for transition of RRC states from RRC_INACTIVE to RRC_CONNECTED for the UE. In the first sequence step 1021, DL traffic is detected on the NG-U tunnel(s) by gNB-CU-UP 104. In the second sequence step 1022, DL DATA NOTIFICATION message is sent by gNB-CU-UP 104 to gNB-CU-CP 103. In the third sequence step 1023, gNB-CU-CP 103 sends PAGING message to gNB-DU 102. In the fourth sequence step 1024, gNB-DU 102 sends PAGING message to UE 101. In the fifth sequence step 1025, UE 101 sends RRCResumeRequest message to gNB-DU 102. In the sixth sequence step 1026, gNB-DU 102 includes RRCResumeRequest in INITIAL UL RRC MESSAGE TRANSFER message sent to gNB-CU-CP 103. In the seventh sequence step 1027, gNB-CU-CP 103 sends UE CONTEXT SETUP REQUEST message (which can include UL TEIDs) to gNB-DU 102. In the eighth sequence step 1028, gNB-DU 102 responds by sending UE CONTEXT SETUP RESPONSE message (which can include DL TEIDs) to gNB-CU-CP 103. In the ninth sequence step 1029, RRC-RESUME procedure is implemented between UE 101 and gNB-CU-CP 103. In the tenth sequence step 1030, BEARER CONTEXT MODIFICATION REQUEST message (with resume indication and DL TEIDs) is sent by gNB-CU-CP 103 to gNB-CU-UP 104. In the eleventh sequence step 1031, BEARER CONTEXT MODIFICATION RESPONSE message is sent to gNB-CU-CP 103 from gNB-CU-UP 104.

In the above-described call flows illustrated in FIGS. 10a and 10b, the NG/S1 UL UP Transport Layer Information IE can be available (i) in sequence step 1027 of the call flow shown in FIG. 10b, and/or (ii) in sequence step 1015 of the call flow shown in FIG. 10a. The same value for the IE is available in the above-mentioned sequence steps in the call flow. The network-interface-specific temporary RAN identifiers for the UE, e.g., gNB-CU UE F1AP ID and gNB-DU UE F1AP ID IEs for the F1 interface between the gNB-CU 203 and gNB-DU 102 are exchanged in sequence steps 1014-1017 and 1020 of the call flow in FIG. 10a, and sequence steps 1026-1028 of the call flow in FIG. 10b; and gNB-CU-CP UE E1AP ID and gNB-CU-UP UE E1AP ID IEs for the E1 interface between the gNB-CU-CP 103 and gNB-CU-UP 104 are exchanged in sequence steps 1030 and 1031 of the call flow shown in FIG. 10b. These network-interface-specific temporary RAN identifiers for the UE can be correlated with the NG/S1 UL UP Transport Layer Information IE available as mentioned in the beginning of this paragraph.

Figure 11:
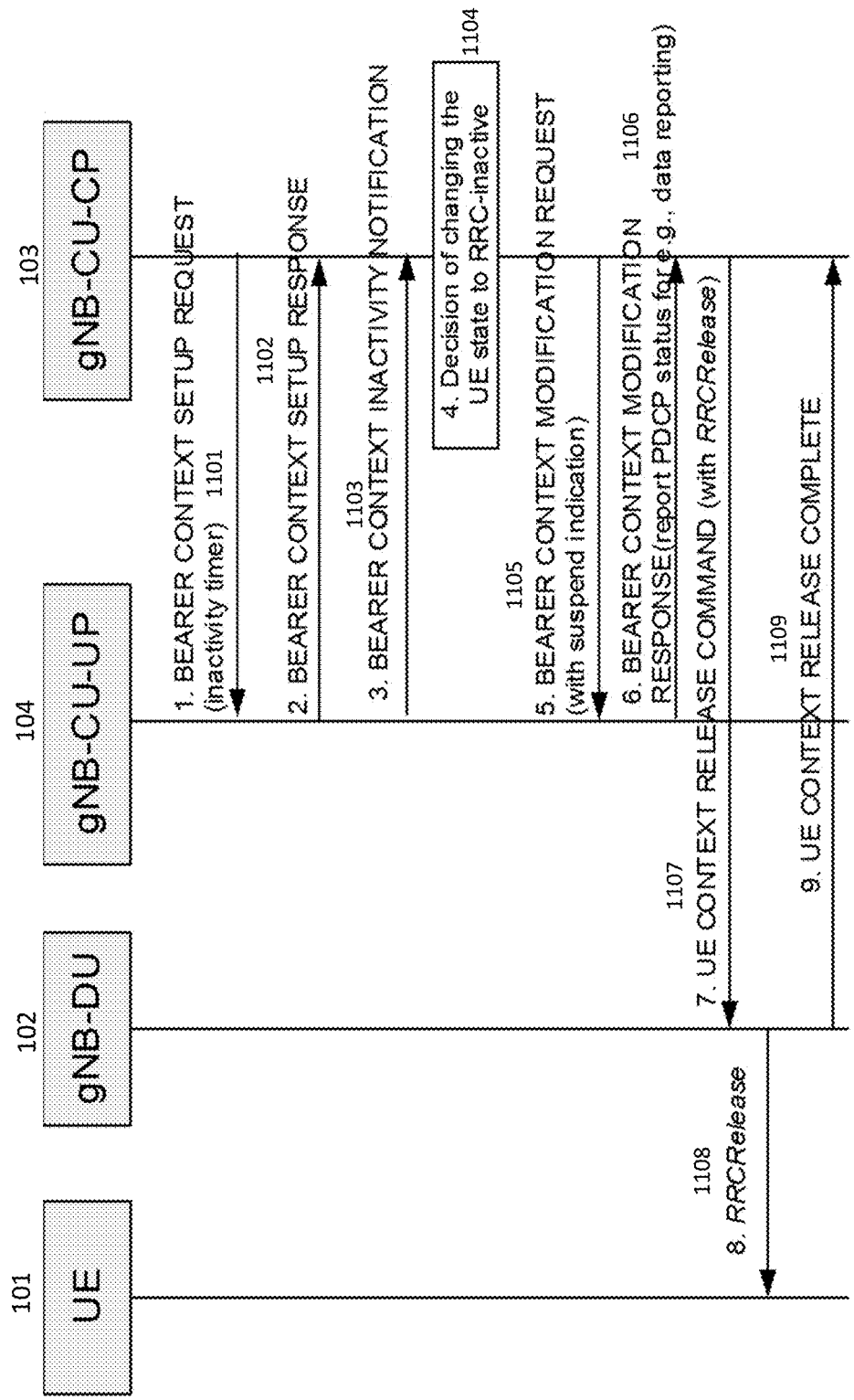
FIG. 11 illustrates the standard 3GPP procedures involved in the 3GPP-defined call flow for transition of RRC states from RRC_CONNECTED to RRC_INACTIVE for the UE.

FIG. 11 illustrates the standard 3GPP procedures involved in the 3GPP-defined call flow for transition of RRC states from RRC_CONNECTED to RRC_INACTIVE for the UE. In the first sequence step 1101, gNB-CU-CP 103 sends BEARER CONTEXT SETUP REQUEST message (e.g., with UE/PDU session/DRB level inactivity timer) to gNB-CU-UP 104. In the second sequence step 1102, gNB-CU-UP 104 sends BEARER CONTEXT SETUP RESPONSE message to gNB-CU-CP 103. In the third sequence step 1103, gNB-CU-UP 104 sends BEARER CONTEXT INACTIVITY NOTIFICATION message (e.g., with inactivity monitoring results) to gNB-CU-CP 103. In the fourth sequence step 1104, gNB-CU-CP 103 decides whether the UE state should be changed to RRC-inactive. In the fifth sequence step 1105, gNB-CU-CP 103 sends to gNB-CU-UP 104 the BEARER CONTEXT MODIFICATION REQUEST message (with a suspend indication, i.e., Bearer Context Status Change indicating UE 101 is entering RRC-inactive state). In the sixth sequence step 1106, gNB-CU-UP 104 sends to gNB-CU-CP 103 the BEARER CONTEXT MODIFICATION RESPONSE message (including PDCP UL and DL status e.g., for data reporting). In the seventh sequence step 1107, gNB-CU-CP 103 sends to gNB-DU 102 the UE CONTEXT RELEASE COMMAND message (including RRCRelease message). In the eighth sequence step 1108, gNB-DU 102 sends the RRCRelease message to UE 101. In the ninth sequence step 1109, gNB-DU 102 sends the UE CONTEXT RELEASE COMPLETE message to the gNB-CU-CP 103.

In the above-described call flow illustrated in FIG. 11, the NG/S1 UL UP Transport Layer Information IE can be available in sequence step 1101 and/or sequence step 1105. The same value for the IE is available in the above-mentioned sequence steps in the call flow. The network-interface-specific temporary RAN identifiers for the UE, e.g., gNB-CU-CP UE E1AP ID and gNB-CU-UP UE E1AP ID IEs for the E1 interface between the gNB-CU-CP and gNB-CU-UP are exchanged in sequence steps 1101-1103 and 1105-1106 shown in FIG. 11; and the gNB-CU UE F1AP ID and gNB-DU UE F1AP ID IEs for the F1 interface between the gNB-CU-CP 103 and gNB-DU 102 are exchanged in sequence steps 1107 and 1109 shown in FIG. 11. These network-interface-specific temporary RAN identifiers for the UE can be correlated with the NG/S1 UL UP Transport Layer Information IE available as mentioned in the beginning of this paragraph.

The above-described example embodiments provide a mechanism for unique identification of individual UEs in the MC, which mechanism provides, among others, the following advantages:

1. The mechanism overcomes the problems for UE identification caused by the temporary nature of UE identifiers in the RAN.

2. The mechanism overcomes the problems caused by the usage of different RAN identifiers for the same UE across different network interfaces.

3. The unique identification can be retained across multiple connectivity, mobility, and context sessions for the UE.

4. The unique identification can work for both MC components, i.e., the non-RT MC and the near-RT MC.

5. The mechanism utilizes identifiers transmitted across the network interfaces and the NG/S1 UL UP Transport Layer Information IE, which is a common IE as part of messages transmitted across all the network interfaces. The NG/S1 UL UP Transport Layer Information is also part of the UE Context Information transmitted across network interfaces.

6. The mechanism offers the above-noted advantages while i) still meeting the privacy and anonymity requirements of the subscriber UE, and ii) sufficiently taking into account the UE context.

7. The mechanism helps to optimize the radio resource management decisions on a per-UE basis, irrespective of the changes in connectivity and mobility sessions for the UE in the RAN.

8. By enabling unique identification of individual UEs in the RIC, the mechanism serves as an important component in building service and information models for the E2/O1 interfaces and extensible applications (xApps and rApps) in the near-RT RIC and non-RT RIC that can control and optimize the radio resource management decisions on a per-UE basis for a wide variety of RIC use-cases, e.g., traffic steering, QoS, etc.

9. The mechanism can be adopted in O-RAN standards as a means to uniquely identify UEs in the RIC components.

As a summary, several examples of the method and the system according to the present disclosure are provided.

A first example of the method according to the present disclosure provides a method of uniquely identifying a user equipment (UE) connected to a radio access network (RAN), comprising: providing a radio access network intelligent controller (MC) component associated with the RAN; configuring, by a packet data convergence protocol (PDCP) layer, a default data radio bearer (DRB) for the UE to maintain Internet Protocol (I) Protocol Data Unit (PDU) connectivity with the RAN; and using, by the MC, one of NG uplink (UL) user plane (UP) Transport Layer Information or S1 UL UP Transport Layer Information of the default DRB for uniquely identifying the UE for the entire time the UE is connected to the RAN.

In a second example of the method modifying the first example of the method, the unique identification is retained across at least one of i) multiple connectivity sessions for the UE, ii) multiple mobility sessions for the UE, and iii) multiple context sessions for the UE.

In a third example of the method modifying the first example of the method, the one of the NG UL UP Transport Layer Information or the S1 UL UP Transport Layer Information is commonly exchanged as part of UE-associated messages across all the network interfaces in the RAN.

In a fourth example of the method modifying the second example of the method, the one of the NG UL UP Transport Layer Information or the S1 UL UP Transport Layer Information is exchanged in at least one of the following interfaces: F1 interface, E1 interface, Xn interface, NG interface, X2 interface, and S1 interface.

In a fifth example of the method modifying the fourth example of the method, the UE is uniquely identified by correlating the one of the NG UL UP Transport Layer Information or the S1 UL UP Transport Layer Information of the default DRB with at least one other RAN network-interface-specific identifier for the UE.

In a sixth example of the method modifying the fifth example of the method, the at least one other RAN network-interface-specific identifier for the UE includes at least one RAN UE identifier used over at least one of the following interfaces: F1 interface, E1 interface, Xn interface, NG interface, X2 interface, and S1 interface.

In a seventh example of the method modifying the first example of the method, the UE is uniquely identified by correlating the one of the NG UL UP Transport Layer Information or the S1 UL UP Transport Layer Information of the default DRB with at least one other RAN network-interface-specific identifier for the UE used over at least one of the following interfaces: F1 interface, E1 interface, Xn interface, NG interface, X2 interface, and S1 interface.

In an eighth example of the method modifying the seventh example of the method, in initial access to the RAN by the UE, at least one of: i) the one of the NG UL UP Transport Layer Information or the S1 UL UP Transport Layer Information of the default DRB is available in at least one of a call flow between Access and Mobility Management Function (AMF) to gNodeB-Centralized Unit-Control Plane (gNB-CU-CP), a call flow between gNB-CU-CP and gNodeB-Centralized Unit-User Plane (gNB-CU-UP), and a call flow between gNB-CU-CP and gNodeB-Distributed Unit (gNB-DU); and ii) the at least one other RAN network-interface-specific identifier for the UE includes at least one identifier for the UE used over at least one of the NG interface, the E1 interface, and the F1 interface.

In a ninth example of the method modifying the seventh example of the method, in intra-centralized-unit (CU), intra-distributed-unit (DU), inter-cell handover for the UE, at least one of: i) the one of the NG UL UP Transport Layer Information or the S1 UL UP Transport Layer Information of the default DRB is available in a call flow between gNodeB-Centralized Unit (gNB-CU) and gNodeB-Distributed Unit (gNB-DU); and ii) the at least one other RAN network-interface-specific identifier for the UE includes at least one identifier for the UE used over the F1 interface.

In a tenth example of the method modifying the seventh example of the method, in intra-centralized-unit (CU), inter-distributed-unit (DU), inter-cell handover for the UE, at least one of: i) the one of the NG UL UP Transport Layer Information or the S1 UL UP Transport Layer Information of the default DRB is available in a call flow between gNodeB-Centralized Unit (gNB-CU) and gNodeB-Distributed Unit (gNB-DU); and ii) the at least one other RAN network-interface-specific identifier for the UE includes at least one identifier for the UE used over the F1 interface.

In an eleventh example of the method modifying the seventh example of the method, in inter-centralized-unit-control plane (CU-CP) handover for the UE, at least one of: i) the one of the NG UL UP Transport Layer Information or the S1 UL UP Transport Layer Information of the default DRB is available in at least one of a call flow between a source gNodeB-CU-CP (gNB-CU-CP) and a target gNodeB-CU-CP (gNB-CU-CP), a call flow between the target gNB-CU-CP and a target gNodeB-Centralized-Unit-User Plane (gNB-CU-UP), a call flow between a source gNB-CU-UP and the source gNB-CU-CP, and a call flow between the target gNB-CU-UP and the target gNB-CU-CP; and ii) the at least one other RAN network-interface-specific identifier for the UE includes at least one identifier for the UE used over at least one of the Xn interface, the E1 interface, and the F1 interface.

In a twelfth example of the method modifying the seventh example of the method, in inter-centralized-unit-user-plane (CU-UP) handover for the UE, at least one of: i) the one of the NG UL UP Transport Layer Information or the S1 UL UP Transport Layer Information of the default DRB is available in at least one of a call flow between a gNodeB-centralized-unit-control plane (gNB-CU-CP) and a target gNodeB-Centralized-Unit-User Plane (gNB-CU-UP), a call flow between the gNB-CU-CP and a source gNB-CU-UP, and a call flow between the gNB-CU-CP and the target gNB-CU-UP; and ii) the at least one other RAN network-interface-specific identifier for the UE includes at least one identifier for the UE used over at least one of the E1 interface and the F1 interface.

In a thirteenth example of the method modifying the seventh example of the method, in at least one of UE context release and bearer context release procedure, at least one of: i) the one of the NG UL UP Transport Layer Information or the S1 UL UP Transport Layer Information of the default DRB is available in at least one of a call flow between a gNodeB-centralized-unit-control plane (gNB-CU-CP) and a gNodeB-Centralized-Unit-User Plane (gNB-CU-UP), and a call flow between the gNB-CU-CP and a gNB-DU; and ii) the at least one other RAN network-interface-specific identifier for the UE includes at least one identifier for the UE used over at least one of the E1 interface and the F1 interface.

In a fourteenth example of the method modifying the thirteenth example of the method, the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

In a fifteenth example of the method modifying the seventh example of the method, in Radio Resource Control (RRC) reestablishment procedure, at least one of: i) the one of the NG UL UP Transport Layer Information or the S1 UL UP Transport Layer Information of the default DRB is available in at least one of a call flow between gNodeB-Centralized Unit (gNB-CU) and gNodeB-Distributed Unit (gNB-DU), and a call flow between a source gNB and a target gNB; and ii) the at least one other RAN network-interface-specific identifier for the UE includes at least one identifier for the UE used over at least one of the F1 interface and the Xn interface.

In a sixteenth example of the method modifying the fifteenth example of the method, the at least one other RAN network-interface-specific identifier for the UE includes at least one of gNB-CU UE F1AP ID used over the F1 interface, gNB-DU UE F1AP ID used over the F1 interface, UE XnAP ID for the source gNB used over the Xn interface, and UE XnAP ID for the target gNB used over the Xn interface.

In a seventeenth example of the method modifying the seventh example of the method, for transition of Radio Resource Control (RRC) states from RRC_INACTIVE to RRC_CONNECTED for the UE, at least one of: i) the one of the NG UL UP Transport Layer Information or the S1 UL UP Transport Layer Information of the default DRB is available in at least one of a call flow between gNodeB-distributed-unit (gNB-DU) and a gNodeB-centralized-unit (gNB-CU), and a call flow between a gNodeB-centralized-unit-control-plane (gNB-CU-CP) and the gNB-DU; and ii) the at least one other RAN network-interface-specific identifier for the UE includes at least one identifier for the UE used over at least one of the F1 interface and the E1 interface.

In an eighteenth example of the method modifying the seventeenth example of the method, the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

In a nineteenth example of the method modifying the seventh example of the method, for transition of Radio Resource Control (RRC) states from RRC_CONNECTED to RRC_INACTIVE for the UE, at least one of: i) the one of the NG UL UP Transport Layer Information or the S1 UL UP Transport Layer Information of the default DRB is available in at least one of a call flow between a gNodeB-centralized-unit-control plane (gNB-CU-CP) and a gNodeB-Centralized-Unit-User Plane (gNB-CU-UP); and ii) the at least one other RAN network-interface-specific identifier for the UE includes at least one identifier for the UE used over at least one of the F1 interface and the E1 interface.

In a twentieth example of the method modifying the nineteenth example of the method, the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

GLOSSARY OF TERMS

AMF: Access and Mobility Management Function
CM: Configuration Management
CU: Centralized Unit
DU: Distributed Unite
E-RAB: E-UTRAN-Radio Access Bearer
E-UTRAN: Evolved-Universal Terrestrial Radio Access Network.
IE: Information Element
IMEI: International Mobile Equipment Identity
IMSI: International Mobile Subscriber Identity
MAC: Medium Access Control
MDT: Minimization of Drive Test
ML: Machine Learning
MME: Mobility Management Entity
O-MeNB: Open RAN-compatible Master Evolved Node B
NG-Core: Next Generation Core
NG-RAN: Next Generation-Radio Access Network
NR: New Radio
NGAP: Next Generation Application Protocol
NSA: Non Stand-alone
PCI: Physical Cell Identity
PDCP: Packet Data Convergence Protocol
PHY: Physical Layer
QoS: Quality-of-Service
RACH: Random Access Control Channel
RLC: Radio Link Control
RNTI: Radio Network Temporary Identifier
RRC: Radio Resource Control
nRT-RIC: Near-Real-Time RAN Intelligent Controller
non-RT MC: Non-Real-Time RAN Intelligent Controller
SA: Stand-Alone
SDAP: Service Data Adaptation Plane
SgNB: Secondary Next-generation Node B
SRB1: Signaling Radio Bearer 1
UPF: User Plane Function
xApps: eXtensible applications
XnAP: Xn Application Protocol

What is claimed is:

1. A method of uniquely identifying a user equipment (UE) connected to a radio access network (RAN), comprising:
providing a radio access network intelligent controller (RIC) component associated with the RAN;
configuring, by a packet data convergence protocol (PDCP) layer, a default data radio bearer (DRB) for the UE to maintain Internet Protocol (I) Protocol Data Unit (PDU) connectivity with the RAN; and
using, by the RIC, one of NG uplink (UL) user plane (UP) Transport Layer Information or S1 UL UP Transport Layer Information of the default DRB for uniquely identifying the UE for the entire time the UE is connected to the RAN.

2. The method of claim 1, wherein the unique identification is retained across at least one of i) multiple connectivity sessions for the UE, ii) multiple mobility sessions for the UE, and iii) multiple context sessions for the UE.

3. The method of claim 1, wherein:
the one of the NG UL UP Transport Layer Information or the S1 UL UP Transport Layer Information is commonly exchanged as part of UE-associated messages across all the network interfaces in the RAN.

4. The method of claim 2, wherein the one of the NG UL UP Transport Layer Information or the S1 UL UP Transport Layer Information is exchanged in at least one of the following interfaces: F1 interface, E1 interface, Xn interface, NG interface, X2 interface, and S1 interface.

5. The method of claim 4, wherein the UE is uniquely identified by correlating the one of the NG UL UP Transport Layer Information or the S1 UL UP Transport Layer Information of the default DRB with at least one other RAN network-interface-specific identifier for the UE.

6. The method of claim 5, wherein the at least one other RAN network-interface-specific identifier for the UE includes at least one RAN UE identifier used over at least one of the following interfaces: F1 interface, E1 interface, Xn interface, NG interface, X2 interface, and S1 interface.

7. The method of claim 1, wherein:
the UE is uniquely identified by correlating the one of the NG UL UP Transport Layer Information or the S1 UL UP Transport Layer Information of the default DRB with at least one other RAN network-interface-specific identifier for the UE used over at least one of the following interfaces: F1 interface, E1 interface, Xn interface, NG interface, X2 interface, and S1 interface.

8. The method of claim 7, wherein in initial access to the RAN by the UE, at least one of:
i) the one of the NG UL UP Transport Layer Information or the S1 UL UP Transport Layer Information of the default DRB is available in at least one of a call flow between Access and Mobility Management Function (AMF) to gNodeB-Centralized Unit-Control Plane (gNB-CU-CP), a call flow between gNB-CU-CP and gNodeB-Centralized Unit-User Plane (gNB-CU-UP), and a call flow between gNB-CU-CP and gNodeB-Distributed Unit (gNB-DU); and
ii) the at least one other RAN network-interface-specific identifier for the UE includes at least one identifier for the UE used over at least one of the NG interface, the E1 interface, and the F1 interface.

9. The method of claim 7, wherein in intra-centralized-unit (CU), intra-distributed-unit (DU), inter-cell handover for the UE, at least one of:
i) the one of the NG UL UP Transport Layer Information or the S1 UL UP Transport Layer Information of the default DRB is available in a call flow between gNodeB-Centralized Unit (gNB-CU) and gNodeB-Distributed Unit (gNB-DU); and
ii) the at least one other RAN network-interface-specific identifier for the UE includes at least one identifier for the UE used over the F1 interface.

10. The method of claim 7, wherein in intra-centralized-unit (CU), inter-distributed-unit (DU), inter-cell handover for the UE, at least one of:
i) the one of the NG UL UP Transport Layer Information or the S1 UL UP Transport Layer Information of the default DRB is available in a call flow between gNodeB-Centralized Unit (gNB-CU) and gNodeB-Distributed Unit (gNB-DU); and
ii) the at least one other RAN network-interface-specific identifier for the UE includes at least one identifier for the UE used over the F1 interface.

11. The method of claim 7, wherein in inter-centralized-unit-control plane (CU-CP) handover for the UE, at least one of:
i) the one of the NG UL UP Transport Layer Information or the S1 UL UP Transport Layer Information of the default DRB is available in at least one of a call flow between a source gNodeB-CU-CP (gNB-CU-CP) and a target gNodeB-CU-CP (gNB-CU-CP), a call flow between the target gNB-CU-CP and a target gNodeB-Centralized-Unit-User Plane (gNB-CU-UP), a call flow between a source gNB-CU-UP and the source gNB-CU-CP, and a call flow between the target gNB-CU-UP and the target gNB-CU-CP; and ii) the at least one other RAN network-interface-specific identifier for the UE includes at least one identifier for the UE used over at least one of the Xn interface, the E1 interface, and the F1 interface.

12. The method of claim 7, wherein in inter-centralized-unit-user-plane (CU-UP) handover for the UE, at least one of:

i) the one of the NG UL UP Transport Layer Information or the S1 UL UP Transport Layer Information of the default DRB is available in at least one of a call flow between a gNodeB-centralized-unit-control plane (gNB-CU-CP) and a target gNodeB-Centralized-Unit-User Plane (gNB-CU-UP), a call flow between the gNB-CU-CP and a source gNB-CU-UP, and a call flow between the gNB-CU-CP and the target gNB-CU-UP; and ii) the at least one other RAN network-interface-specific identifier for the UE includes at least one identifier for the UE used over at least one of the E1 interface and the F1 interface.

13. The method of claim 7, wherein in at least one of UE context release and bearer context release procedure, at least one of:

i) the one of the NG UL UP Transport Layer Information or the S1 UL UP Transport Layer Information of the default DRB is available in at least one of a call flow between a gNodeB-centralized-unit-control plane (gNB-CU-CP) and a gNodeB-Centralized-Unit-User Plane (gNB-CU-UP), and a call flow between the gNB-CU-CP and a gNB-DU; and ii) the at least one other RAN network-interface-specific identifier for the UE includes at least one identifier for the UE used over at least one of the E1 interface and the F1 interface.

14. The method of claim 13, wherein the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

15. The method of claim 7, wherein in Radio Resource Control (RRC) reestablishment procedure, at least one of:

i) the one of the NG UL UP Transport Layer Information or the S1 UL UP Transport Layer Information of the default DRB is available in at least one of a call flow between gNodeB-Centralized Unit (gNB-CU) and gNodeB-Distributed Unit (gNB-DU), and a call flow between a source gNB and a target gNB; and ii) the at least one other RAN network-interface-specific identifier for the UE includes at least one identifier for the UE used over at least one of the F1 interface and the Xn interface.

16. The method of claim 15, wherein the at least one other RAN network-interface-specific identifier for the UE includes at least one of gNB-CU UE F1AP ID used over the F1 interface, gNB-DU UE F1AP ID used over the F1 interface, UE XnAP ID for the source gNB used over the Xn interface, and UE XnAP ID for the target gNB used over the Xn interface.

17. The method of claim 7, wherein for transition of Radio Resource Control (RRC) states from RRC_INACTIVE to RRC_CONNECTED for the UE, at least one of:

i) the one of the NG UL UP Transport Layer Information or the S1 UL UP Transport Layer Information of the default DRB is available in at least one of a call flow between gNodeB-distributed-unit (gNB-DU) and a gNodeB-centralized-unit (gNB-CU), and a call flow between a gNodeB-centralized-unit-control-plane (gNB-CU-CP) and the gNB-DU; and ii) the at least one other RAN network-interface-specific identifier for the UE includes at least one identifier for the UE used over at least one of the F1 interface and the E1 interface.

18. The method of claim 17, wherein the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

19. The method of claim 7, wherein for transition of Radio Resource Control (RRC) states from RRC_CONNECTED to RRC_INACTIVE for the UE, at least one of:

i) the one of the NG UL UP Transport Layer Information or the S1 UL UP Transport Layer Information of the default DRB is available in at least one of a call flow between a gNodeB-centralized-unit-control plane (gNB-CU-CP) and a gNodeB-Centralized-Unit-User Plane (gNB-CU-UP); and ii) the at least one other RAN network-interface-specific identifier for the UE includes at least one identifier for the UE used over at least one of the F1 interface and the E1 interface.

20. The method of claim 19, wherein the at least one other RAN network-interface-specific identifier for the UE includes at least one of gNB-CU-CP UE E1AP ID used over the E1 interface, gNB-CU-UP UE E1AP ID used over the E1 interface, gNB-CU UE F1AP ID used over the F1 interface, and the gNB DU UE F1AP ID used over the F1 interface.

* * * * *